(12) United States Patent
Nishida et al.

(10) Patent No.: US 11,651,280 B2
(45) Date of Patent: May 16, 2023

(54) RECORDING MEDIUM, INFORMATION PROCESSING SYSTEM, AND INFORMATION PROCESSING METHOD

(71) Applicant: Micware Co., Ltd., Kobe (JP)

(72) Inventors: Michihiro Nishida, Kobe (JP); Mahoto Iwasa, Kobe (JP)

( * ) Notice: Subject to any disclaimer, the term of this patent is extended or adjusted under 35 U.S.C. 154(b) by 279 days.

(21) Appl. No.: 16/857,336

(22) Filed: Apr. 24, 2020

(65) Prior Publication Data

US 2020/0342366 A1 Oct. 29, 2020

(30) Foreign Application Priority Data

Apr. 26, 2019 (JP) .............................. JP2019-086467
Aug. 30, 2019 (JP) .............................. JP2019-158569

(51) Int. Cl.
*G06N 20/00* (2019.01)
*G06Q 50/00* (2012.01)
*G06Q 30/02* (2012.01)
*G06Q 30/0203* (2023.01)

(52) U.S. Cl.
CPC ......... *G06N 20/00* (2019.01); *G06Q 30/0203* (2013.01); *G06Q 50/01* (2013.01)

(58) Field of Classification Search
CPC .... G06Q 30/0203; G06Q 10/04; G06N 20/00; G06N 3/0454; G06N 3/084
See application file for complete search history.

(56) References Cited

U.S. PATENT DOCUMENTS

| 10,410,108 | B2* | 9/2019 | Shaji | .................... G06N 3/0454 |
| 10,769,497 | B2* | 9/2020 | Haneda | .................... G06N 3/08 |
| 11,019,017 | B2* | 5/2021 | Garcia | .................... H04L 51/20 |
| 11,095,594 | B2* | 8/2021 | Garcia | .................... H04L 67/22 |
| 11,269,891 | B2* | 3/2022 | Frank | ................. G06Q 30/0282 |
| 11,301,718 | B2* | 4/2022 | Hamedi | ................. G06N 3/084 |
| 2019/0197359 | A1* | 6/2019 | Haneda | .................... G06N 3/08 |
| 2021/0125199 | A1* | 4/2021 | Woodbeck | ......... G06Q 30/0643 |
| 2022/0019853 | A1* | 1/2022 | Hamedi | ............... G06V 10/764 |
| 2022/0058434 | A1* | 2/2022 | Hamedi | ............... G06K 9/6215 |
| 2022/0335256 | A1* | 10/2022 | Saraee | ................ G06V 10/776 |

FOREIGN PATENT DOCUMENTS

| EP | 3606033 A1 * | 2/2020 | ............ B25J 9/0003 |
| JP | 2018-120575 A | 8/2018 | |

* cited by examiner

*Primary Examiner* — Dylan C White
(74) *Attorney, Agent, or Firm* — Morgan, Lewis & Bockius LLP

(57) ABSTRACT

The present disclosure provides an information processing system for predicting an evaluation of an image that is to be posted to a social media platform, and methods of use thereof.

19 Claims, 19 Drawing Sheets

RECORDING MEDIUM, INFORMATION PROCESSING SYSTEM, AND INFORMATION PROCESSING METHOD

CROSS-REFERENCE TO RELATED APPLICATIONS

This application is based upon and claims the benefit of Japanese Patent Application No. 2019-86467, filed on Apr. 26, 2019 and Japanese Patent Application No. 2019-158569, filed on Aug. 30, 2019, each of which is incorporated herein by reference in its entirety.

TECHNICAL FIELD

The present disclosure relates to a recording medium, an information processing system, and an information processing method, and in particular relates to an information processing system and the like that evaluates an image that is to be posted to a social media platform.

BACKGROUND ART

In recent years, it has been common for users to post photographic images taken using a smartphone to a social media platform in order to share personally appealing or interesting images with other users. Users sometimes do this for the purpose of gaining a sense of community through other users' reactions to the posted image (for example, see JP 2018-120575 A).

SUMMARY

Users often hope for a reaction from many other users, and thus tend to care about the appeal of captured images. Users who care about image appeal often capture multiple photographs as candidates for a social media platform post, and then post carefully selected photographic images from among the candidates. Moreover, users who care about image appeal also frequently request a friend to evaluate which photographic image is appealing in a group of photographs.

However, a system for evaluating images that are to be posted to a social media platform is not known.

The present invention may be achieved in light of the above-described issues, and one aspect of the present invention is to provide an information processing system and the like that is capable of predicting an evaluation of an image that is to be posted to a social media platform.

An information processing system according to a first aspect of the present disclosure includes: a type acquisition unit, a count acquisition unit, and a prediction unit. The type acquisition unit acquires an image type of an image. The image is include in image data. The count acquisition unit acquires count data. The count data includes a reaction count and a specific reaction count. The reaction count is the number of reactions for the piece of content that obtained the highest number of reactions from other users in the case where a user posted a plurality of pieces of content to a social media platform. The specific reaction count is the number of reactions from other users for each predetermined image type of an image posted to the social media platform. The prediction unit predicts an evaluation of the image based on the image type of the image and the count data.

The information processing system according to the first aspect of the present disclosure can predict an evaluation of an image that is to be posted to a social media platform.

An information processing system according to a second aspect of the present disclosure is the information processing system of the first aspect, further including a count estimation unit. The count estimation unit estimates a potential count in accordance with a follower count. The potential count indicates the likelihood of receiving reactions from other users if a piece of content is posted to the social media platform by the user. The prediction unit acquires a predicted count of reactions to the image based on the evaluation of the image, the potential count, and the follower count of the predetermined user.

The information processing system according to the second aspect of the present disclosure can acquire the predicted count that predicts approximately how many reactions can be obtained from other users for an image that is to be posted to the social media platform.

An information processing system according to a third aspect of the present disclosure is the information processing system of the second aspect, including a terminal apparatus and a server apparatus. The terminal apparatus includes an image capturing apparatus, an input apparatus, a communication apparatus, and a display apparatus. The image capturing apparatus acquires the image data that includes the image that was captured. The input apparatus receives an input of the follower count of the predetermined user. The communication apparatus transmits the image data. The communication apparatus transmits the follower count of the predetermined user. The communication apparatus receives the predicted count. The display apparatus displays the predicted count. The server apparatus includes the type acquisition unit, the count acquisition unit, the prediction unit, and the count estimation unit, and further includes a server communication unit, and a server storage unit. The server communication unit receives the image data. The server communication unit receives the follower count of the predetermined user. The server communication unit transmits the predicted count. The server storage unit stores a program. The program causes the prediction unit to function through machine learning.

With the information processing system according to the third aspect of the present disclosure, the terminal apparatus that performs communication with the server apparatus can display the predicted count that predicts the number of reactions to an image if posted to the social media platform.

An information processing system according to a fourth aspect of the present disclosure is the information processing system of any of the first to third aspects, wherein the image data includes a still image or a moving image.

The information processing system according to the fourth aspect of the present disclosure can predict an evaluation of a still image or a moving image.

An information processing system according to a fifth aspect of the present disclosure is the information processing system of any of the first to fourth aspects, wherein the type acquisition unit acquires an attribute of an object appearing in the image, and the number of objects appearing in the image.

The information processing system according to the fifth aspect of the present disclosure can predict an evaluation of an image in accordance with an object attribute and the number of objects.

An information processing system according to a sixth aspect of the present disclosure is the information processing system of the fifth aspect, wherein the attributes include human gender, animal type, scenery, and food.

The information processing system according to the sixth aspect of the present disclosure can predict an evaluation of an image in accordance with object attributes such as human gender, animal type, scenery, and food.

A program according to a seventh aspect of the present disclosure causes a computer to function as a type acquisition unit, a count acquisition unit, a count estimation unit, and a prediction unit. The type acquisition unit acquires an image type of an image that is included in image data associated with the image. The count acquisition unit acquires count data. The count data includes a reaction count and a specific reaction count. The reaction count is the number of reactions for the piece of content that obtained the highest number of reactions from other users in the case where a user posted a plurality of pieces of content to a social media platform. The specific reaction count is the number of reactions from other users for each predetermined image type of an image posted to the social media platform. The count estimation unit estimates a potential count in accordance with a follower count. The potential count indicates the likelihood of receiving reactions from other users for a piece of content posted to the social media platform by the predetermined user. The prediction unit acquires a predicted count of reactions for the image from the follower count of the predetermined user, based on the image type of the image, the count data, and the potential count.

The program according to the seventh aspect of the present disclosure can acquire the predicted count that predicts approximately how many reactions can be obtained from other users for an image that is to be posted to the social media platform.

Also, an information processing method according to an eighth aspect of the present disclosure includes a type acquiring step, a count acquiring step, a count estimating step, and a predicting step. The type acquiring step is a step of acquiring an image type of an image included in image data. The count acquiring step is a step of acquiring count data. The count data includes a reaction count and a specific reaction count. The reaction count is the number of reactions for the piece of content that obtained the highest number of reactions from other users in the case where a user posted a plurality of pieces of content to a social media platform. The specific reaction count is the number of reactions from other users for each predetermined image type of an image posted to the social media platform. The count estimating step is a step of acquiring, in accordance with a follower count, a potential count that indicates the likelihood of receiving reactions from other users for a piece of content posted to the social media platform by the predetermined user. The predicting step is a step of acquiring a predicted count of reactions for the image from the follower count of the predetermined user, based on the image type of the image, the count data, and the potential count.

The information processing method according to the eighth aspect of the present disclosure can acquire the predicted count that predicts approximately how many reactions can be obtained from other users for an image that is to be posted to the social media platform.

An information processing system according to a ninth aspect of the present disclosure includes an information processing apparatus and an information terminal apparatus (e.g., an electronic device such as a smart phone, a camera with connectivity, a tablet with connectivity, or a computing device). The information terminal apparatus is configured to exchange data with the information processing apparatus. The information processing apparatus includes an image acquisition unit that acquires image data that is associated with location data. The information processing apparatus includes an evaluation value calculation unit that calculates an evaluation value that indicates the likelihood of obtaining social networking service (SNS) reactions (e.g., reactions received on a social media platform) for the image data that was acquired by the image acquisition unit. The information processing apparatus includes an output unit that outputs (e.g., displays or provides) screen information that shows a spot (e.g., a location) where there is a high likelihood of being able to capture an image having a high evaluation value, based on the evaluation value calculated for the image data and the location data corresponding to the image data.

An information processing method according to a tenth aspect of the present disclosure is an information processing method executed by the information processing apparatus and the information terminal apparatus in the information processing system. The information processing apparatus acquires image data that is associated with location data. The information processing apparatus calculates an evaluation value that indicates the likelihood of obtaining SNS reactions for the image data that was acquired. The information processing apparatus transmits, to the information terminal apparatus, screen information that shows a spot where there is a high likelihood of being able to capture an image having a high evaluation value, based on the evaluation value calculated for the image data and the location data corresponding to the image data. The information terminal apparatus displays a screen that shows spots based on the screen information.

In an eleventh aspect of the present disclosure, the information processing apparatus calculates, for image data that is associated with location data, an evaluation value that indicates a likelihood of obtained SNS reactions or a predicted value thereof. Location data that is associated with image data having a relatively high evaluation value indicates a spot where there is a high likelihood of being able to capture an image that gains many reactions. Screen information that indicates the spot is created by the information processing apparatus and output. Whether or not the evaluation value is high may be determined according to whether or not the calculated evaluation value is greater than or equal to a predetermined value that has been set.

The information processing apparatus may cause a first communication unit that corresponds to the output unit to transmit, to the information terminal apparatus, screen information that indicates spots within a specified (e.g., automatically defined, predetermined, or user-defined) range from the location indicated by the location data that was acquired by a location data acquisition unit provided in the information terminal apparatus and transmitted by a second communication unit.

The specified range may be range that was set in advance (e.g., based on a default setting or based on a user setting), or may be a range designated by the information terminal apparatus. The range may be designated as a display range of a map displayed by a display unit of the information terminal apparatus.

The location data acquired by the location data acquisition unit of the information terminal apparatus may be location data that indicates the location of the information terminal apparatus, that is to say the current location of the information terminal apparatus. The information processing apparatus transmits, to the information terminal apparatus, screen information that indicates spots where there is a high likelihood of being able to capture an image having a high evaluation value in the specified range from the location indicating the current location of the information terminal apparatus.

In a twelfth aspect of the present disclosure, screen information that indicates spots where there is a high likelihood of being able to capture an image having a high evaluation value in a specified range based on the location of the information terminal apparatus is created and transmitted to the information terminal apparatus. In other words, spots are presented based on the current location of the user who is using the information terminal apparatus.

The location data that is transmitted from the information terminal apparatus to the information processing apparatus may include destination location data accepted by the information terminal apparatus. The information processing apparatus transmits, to the information terminal apparatus, screen information that indicates spots where there is a high likelihood of being able to capture an image having a high evaluation value. The spots are located within the specified range from a destination location indicated by the information terminal apparatus (e.g., a destination accepted by the information terminal apparatus or a destination of the user as input into the information terminal apparatus).

In a thirteenth aspect of the present disclosure, screen information that indicates spots where there is a high likelihood of being able to capture an image having a high evaluation value in a specified range based on a location accepted by the information terminal apparatus is created and transmitted to the information terminal apparatus. In other words, spots are presented based on the destination of the user who is using the information terminal apparatus.

In the information processing system according to a fourteenth aspect of the present disclosure, the information processing apparatus includes a type acquisition unit that acquires an image type of the image in the image data acquired by the image acquisition unit, and the output unit may output, for each image type, screen information that is based on the location data associated with image data that has a higher evaluation value that was calculated by the evaluation value calculation unit.

In a fifteenth aspect of the present disclosure, for each image type, screen information that indicates spots where there is a high likelihood of being able to capture an image having a high evaluation value is created by the information processing apparatus and transmitted to the information terminal apparatus. In other words, the user using the information terminal apparatus can display presented spots according to image type.

In the information processing system according to a sixteenth aspect of the present disclosure, the evaluation value calculation unit may output an evaluation value based on an evaluation model that has been trained so as to receive photographic image or moving image data and output the evaluation value for the photographic image or the moving image.

In a seventeenth aspect of the present disclosure, the evaluation value is output with use of a trained evaluation model. The evaluation value can be precisely calculated based on actual results.

In the information processing system according to an eighteenth aspect of the present disclosure, the screen information is information for displaying a screen including a list of related data that includes spot descriptions in order of highest evaluation value.

A computer program according to a nineteenth aspect of the present disclosure causes a computer to perform processing for accepting a designation of location data that indicates a location, transmitting the designated location data or a specified range that includes the location indicated by the location data to the information processing apparatus by communication, receiving screen information that indicates a spot where there is a high likelihood of being able to capture an image having a high evaluation value from the information processing apparatus, and displaying a screen that includes a list of related data that includes spot descriptions in order of highest evaluation value based on the screen information.

In a twentieth aspect of the present disclosure, spots where there is a high likelihood of being able to capture an image having a high evaluation value are displayed as a list of related data including spot descriptions in order of highest evaluation. Listing the spots in order of greater expectation improves the recognizability (e.g., ability for a user or viewer to recognize the spot or location).

In the information processing system according to a twenty-first aspect of the present disclosure, the screen information is information for displaying objects including evaluation value text at positions of the spots on a map image.

A computer program according to a twenty-second aspect of the present disclosure causes a computer to perform processing for accepting a designation of location data that indicates a location, transmitting the designated location data or a specified range that includes the location indicated by the location data to the information processing apparatus by communication, receiving screen information that indicates a spot where there is a high likelihood of being able to capture an image having a high evaluation value from (e.g., using or via) the information processing apparatus, and displaying a screen that includes a list of related data that includes spot descriptions in order of highest evaluation value based on the screen information.

In a twenty-third aspect of the present disclosure, spots where there is a high likelihood of being able to capture an imaging having a high evaluation value are displayed as objects (e.g., symbols, icons, or pins) arranged on a map image (e.g., an image of a map or a geographical map). Thus, the locations of spots relative to the current location or the destination can be visually recognized more easily.

In a twenty-fourth aspect of the present disclosure, a non-transitory recording medium has recorded thereon a program for causing a computer to execute processing. The program causes the computer to perform processing for acquiring an image type of an image included in image data. The program causes the computer to execute processing that includes calculating the above-described evaluation values based on an evaluation model that has been trained so as to, upon receiving an input of the image data, output evaluation values that indicate the likelihood of obtaining reactions to the image data on a Social Network Service (SNS) for each image type.

DETAILED DESCRIPTION

Figure 1:
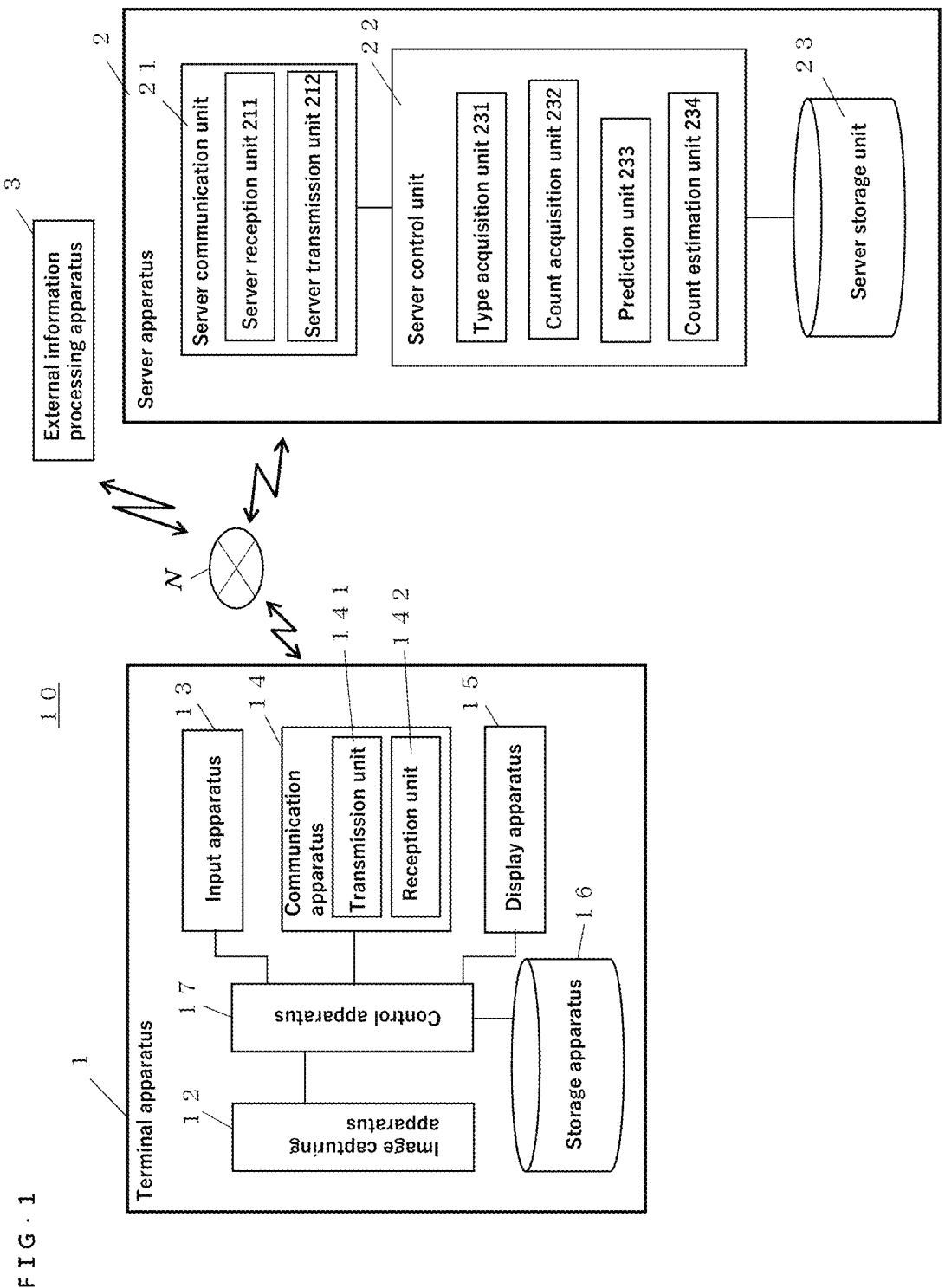
FIG. 1 is a block diagram of an information processing system according to some embodiments of the present disclosure.

The following describes an information processing system according to some embodiments of the present disclosure. As shown in FIG. 1, the information processing system 10 may include a terminal apparatus 1 and a server apparatus 2. The terminal apparatus 1 may be configured to communicate with the server apparatus 2.

In one aspect, the terminal apparatus 1 includes an image capturing apparatus 12, an input apparatus 13, a communication apparatus 14, and a display apparatus 15. The image capturing apparatus 12 may be configured to acquire image data of a captured image. The input apparatus 13 may be configured to acquire the follower count of a predetermined user. The communication apparatus 14 may be configured transmit image data and the follower count of the predetermined user.

In another aspect, the server apparatus 2 includes a server communication unit 21, a server control unit 22, and a server storage unit 23. The server communication unit 21 may be configured to receive image data and receiving the follower count of the predetermined user. The server control unit 22 includes a type acquisition unit 231, a count acquisition unit 232, a prediction unit 233, and a count estimation unit 234.

The server storage unit 23 may store a program for causing the prediction unit 233 to function through machine learning.

The type acquisition unit 231 may acquire the image type of an image. The image is included in image data. The count acquisition unit 232 may acquire count data. The count data includes a reaction count and a specific reaction count. The reaction count is the number of reactions for the piece of content that received the most reactions from other users from among multiple pieces of content that were posted to a social media platform (also referred to as a social medium) by the user. The specific reaction count is the number of reactions from other users for each predetermined type of image posted to a social media platform. The prediction unit 233 predicts an evaluation of an image based on the image type and count data.

In another aspect, the count estimation unit 234 estimates a potential count in accordance with a follower count. The potential count indicates the potential for obtaining reactions from other users for a piece of content that the user may post to a social media platform. The prediction unit 233 may be configured to acquire a predicted count that indicates a predicted number of reactions to an image based on an evaluation of the image and the potential count, as well as the follower count of the predetermined user.

In the server apparatus 2, the server communication unit 21 may be configured to transmit a predicted count. In the terminal apparatus 1, the communication apparatus 14 may receive the predicted count. The display apparatus 15 may be configured display the predicted count.

The information processing system 10, according to some embodiments, may predict an evaluation of an image that is to be posted to a social media platform. The information processing system 10, according to some embodiments, may also display, on the terminal apparatus 1 that communicates with the server apparatus 2, a predicted count that predicts how many other users will react to the image that is to be posted to a social media platform.

The social media platform referred to here is configured by an external information processing apparatus 3 that can communicate with the terminal apparatus 1, for example. A Social Networking Service (SNS) is one example of such a social media platform. A SNS is configured to allow users to post content such as photographs, videos, and documents, for example. Examples of a SNS include Twitter®, Facebook®, Instagram®, Google+®, Flickr®, and YouTube®. The social media platform may be configured to allow the input of evaluations of content posted by other users. For example, the social media platform allows users to "like" a piece of content that is personally appealing or interesting as a form of providing evaluation of content posted by other uses. The social media platform may be configured to display the cumulative value of the number of "likes".

In another aspect, on the social media platform, the higher the cumulative value of the number of "likes" is for a piece of content posted by the user, the more other users felt that content was interesting or appealing, and the more highly the other users evaluated the posted content. In other words, the number of "likes" is representative of the number of times that other users reacted. Here, the highest number of "likes" among pieces of user content will be referred to as the highest "like" count. Note that on the social media platform, the term "followers" refers to people who stay aware of updates by a specific user and track the activity of that user. Users can register as followers on the social media platform. On the social media platform, the term "follower count" refers to the number of followers who track the activity of a specific user. The social media platform may be configured to allow the follower count, which indicates the number of registered followers, to be checked from the terminal apparatus 1.

The following is a more detailed exemplary description of configurations in the information processing system 10 according to some embodiments.

As shown by an example depicted in FIG. 1, in addition to the image capturing apparatus 12, the input apparatus 13, the communication apparatus 14, and the display apparatus 15, the terminal apparatus 1 further includes a storage apparatus 16 and a control apparatus 17. The terminal apparatus 1 is a terminal device used by the user. Examples of the terminal apparatus 1 include a mobile phone, a camera, a video camera, a tablet, a notebook computer, and a smartphone.

The information processing system 10 according to some embodiments may be configured such that the terminal apparatus 1 used by the user and the server apparatus 2 can communicate with each other. The terminal apparatus 1 and the server apparatus 2 are wirelessly connected via a public telecommunication network NO, for example. In FIG. 1, double-headed arrows illustrate the flow of information in communication performed via the public telecommunication network NO.

The image capturing apparatus 12 may be configured as a camera that includes an imaging lens, a diaphragm, a shutter, an image sensor, and an image processing engine. One example of the image sensor is a CCD (Charge Coupled Device) image sensor. The image processing engine acquires image data by performing image processing on data acquired with use of the CCD image sensor. The image processing engine is configured by a semiconductor device. The image data can be broadly interpreted as including captured image data, photographic data obtained by modifying the captured image data, and metadata related to the captured image data.

The input apparatus 13 may be configured to receive an input of text or image data. Examples of the input apparatus 13 include a touch panel that is integrated with the display apparatus 15, a speech input apparatus that enables input through speech, and physical keys. The input apparatus 13 is not limited to being configured as a touch panel that is integrated with the display apparatus 15, and may be simply configured as an input unit. In the case where the input apparatus 13 is configured by a touch panel, the touch sensor thereof may employ a capacitive sensitive structure, a resistive membrane structure, a surface acoustic wave structure, an infrared structure, or an electromagnetic induction structure.

In another aspect, the communication apparatus 14 is configured to communicate with the server communication unit 21 of the server apparatus 2 via the public telecommunication network NO. The communication apparatus 14 may be configured to perform wired communication or the like in addition to communication via the public telecommunication network NO. The communication apparatus 14 may be configured to perform wireless communication compliant with infrared communication, Wi-Fi (registered trademark), Bluetooth (registered trademark), or Bluetooth low energy (BLE) communication standards.

In another aspect, the communication apparatus 14 includes a transmission unit 141 and a reception unit 142. The transmission unit 141 may be configured to transmit input data to the server apparatus 2. The reception unit 142 may be configured to receive an evaluation of an image that was predicted by the server apparatus 2 through machine learning based on the input data. The reception unit 142 may be further configured to receive a predicted count that was predicted by the server apparatus 2. In certain embodiments, the communication apparatus 14 performs user authentication beforehand using a user identification (ID) in order to specify the user for which a predicted count is to be predicted for an image transmitted from the terminal apparatus 1. The user ID may be the terminal ID of the terminal apparatus 1.

In another aspect, the display apparatus 15 is configured to display an image included in image data captured by the image capturing apparatus 12. The display apparatus 15 may be also configured to display an evaluation of the image. The display apparatus 15 may be further configured to display a predicted count indicating a prediction of reactions to the image. One example of the display apparatus 15 is a touch panel that is integrated with the input apparatus 13. The display apparatus 15 is not limited to being configured as a touch panel that is integrated with the input apparatus 13, and may be simply configured as a display unit. Other examples of the display apparatus 15 include a liquid crystal display apparatus and an organic EL (Electro Luminescence) display apparatus.

In another aspect, the storage apparatus 16 includes a volatile storage apparatus in which information disappears when the power supply is turned off, and a non-volatile storage apparatus in which information does not disappear even if the power supply is turned off. The volatile storage apparatus may temporarily store information that is processed by the control apparatus 17. One example of the volatile storage apparatus is a RAM (Random Access Memory). The non-volatile storage apparatus may be a storage apparatus that can store various types of information processing programs and various types of information. One example of the non-volatile storage apparatus is a ROM (Read On Memory). The ROM is a flash memory or an HDD (Hard Disk Drive), for example. The storage apparatus 16 may be configured to store image data captured by the image capturing apparatus 12.

The control apparatus 17 may control various types of information processing operations. The control apparatus 17 may be electrically connected to the image capturing apparatus 12, the input apparatus 13, the communication apparatus 14, the display apparatus 15, and the storage apparatus 16. The control apparatus 17 may be configured to control the image capturing apparatus 12, the input apparatus 13, the communication apparatus 14, and the display apparatus 15 based on an information processing program stored in the storage apparatus 16. The control apparatus 17 is configured by a Central Processing Unit (CPU) or a Micro Processing Unit (MPU), for example.

The following describes exemplary server apparatus 2 shown in FIG. 1. In the server apparatus 2, the server control unit 22 is electrically connected to the server communication unit 21 and the server storage unit 23.

The server communication unit 21 may be configured to communicate with the communication apparatus 14 of the terminal apparatus 1 via the public telecommunication network NO. The server communication unit 21 may be configured to perform wired communication or the like in addition to communication via the public telecommunication network NO. The server communication unit 21 and the communication apparatus 14 may be configured to perform wireless communication compliant with infrared communication, Wi-Fi (registered trademark), Bluetooth (registered trademark), or BLE communication standards.

The server communication unit 21 includes a server reception unit 211 and a server transmission unit 212. The server reception unit 211 may be configured to receive image data and information indicating the follower count of a predetermined user from the terminal apparatus 1. The server transmission unit 212 may be configured to transmit, to the terminal apparatus 1, an evaluation of an image that was predicted by the server control unit 22 through machine learning. For example, the server transmission unit 212 may transmit a percentage that indicates an evaluation of the image to the terminal apparatus 1.

The server control unit 22 is configured with the functions of a type acquisition unit 231, a count acquisition unit 232, and a prediction unit 233. The server control unit 22 may also be configured with the function of a count estimation unit 234 in addition to the type acquisition unit 231, the count acquisition unit 232, and the prediction unit 233. For example, the server control unit 22 can cause the type acquisition unit 231 or the prediction unit 233 to operate by running a program for machine learning stored in the server storage unit 23. The server control unit 22 is configured by a CPU, an MPU, or a Graphics Processing Unit (GPU), for example.

Figure 2:
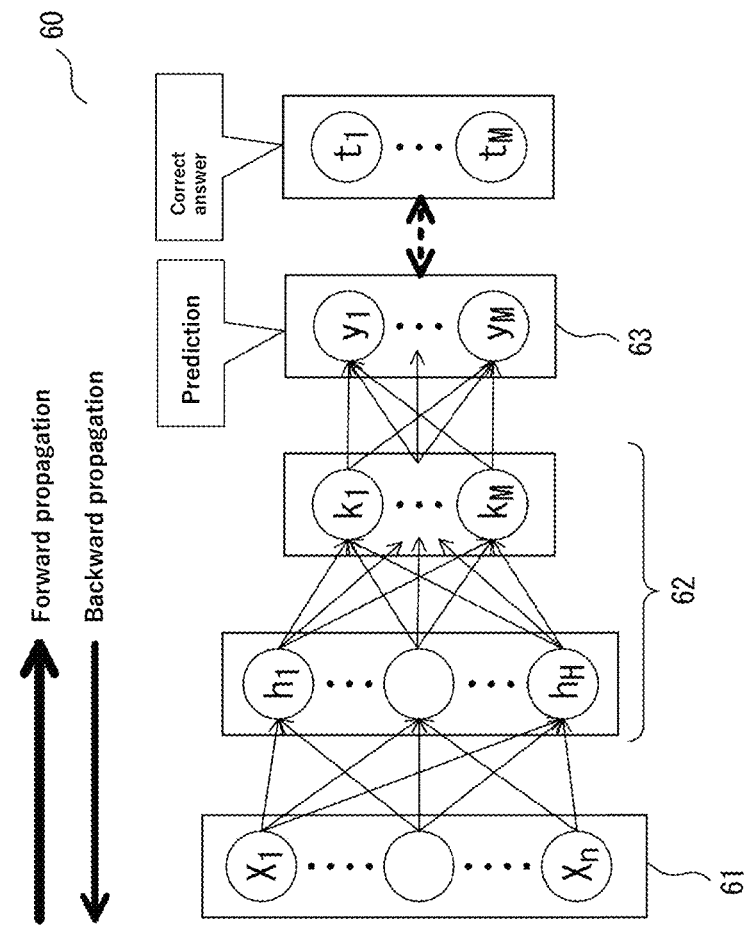
FIG. 2 is an illustrative diagram of an example of a method for acquiring image types through machine learning.

The type acquisition unit 231 may be configured to receive image data as input data and perform deep learning processing. As shown in FIG. 2, deep learning is a machine learning method performed by a multilayer neural network 60. FIG. 2 illustrates an example of a method in which the type acquisition unit 231 acquires the type of an image through deep learning (e.g., machine learning). An input layer 61, an intermediate layer 62, and an output layer 63 are included in this deep learning. The intermediate layer 62 is also called a hidden layer. The intermediate layer 62 may include two or more layers. The intermediate layer 62 tends to be untrained if it includes too few layers. The intermediate layer 62 tends to be overfitting if it includes too many layers. In this deep learning, when image data is input to the input layer 61 as input data, output data is then output from the output layer 63. The output data expresses (e.g., shows, indicates, or includes) a prediction result of which type of image the image in the image data is (e.g., determines an image type for the image), from among predetermined types. In this deep learning process, multiple pairs of input data and corresponding training data have been prepared in advance.

The type acquisition unit 231 processes the training data through the input layer 61, the intermediate layer 62, and the output layer 63. Specifically, the type acquisition unit 231 dynamically generates and learns optimum (e.g., optimal or ideal) feature amounts for the input image data, and performs forward propagation in which computation processing is performed through forward information propagation. In FIG. 2, the forward propagation direction is indicated by the extra-bold one-way arrow.

Also, when learning is performed, the type acquisition unit 231 is given information indicating what type of image the output data is, and performs back propagation in which computation processing is performed through backward information propagation. In FIG. 2, the backward propagation direction is indicated by the bold one-way arrow. Note that in this machine learning, the type acquisition unit 231 evaluates the difference in output between the output data and the input data given as training data for learning. It is preferable that the type acquisition unit 231 uses backward propagation to successively optimize (e.g., improve) the parameters in the layers and the nodes in the machine learning based on the output difference. Through this learning, the type acquisition unit 231 can bring the parameters of the layers gradually closer to optimum values (e.g., benchmark values or ideal values). When image data is input to the input layer 61, the type acquisition unit 231 can acquire an image type from the image data with use of the parameters that were adjusted based on the machine learning results.

It is sufficient that the number of layers is set such that the type acquisition unit 231 acquires the image type from the image data. The artificial neurons output the sum of the products of multiplying the output of the previous layer by a parameter. The output data of the artificial neurons is controlled by an activation function and given nonlinearity. A softmax function, a sigmoid function, a Gaussian function, or the like can be applied as the activation function.

The type acquisition unit 231 is given information including M pieces of correct-answer data t1 to tM that indicate what image type the image data corresponds to for obtained output data y1 to yM. In this machine learning, the type acquisition unit 231 is given the correct-answer data t1 to tM and performs back propagation so as to successively adjust the parameters to optimum values. In other words, through back propagation, the type acquisition unit 231 can evaluate the difference between the output data and the correct-answer data and optimize the parameters. Note that OpenCV, Numpy, Matplotlib, Chainer, or the like can be applied as software used when performing machine learning.

For example, the type acquisition unit 231 may be configured to identify whether an object included in an image is one of seven types including 1 male: M, 1 female: W, people: S, food: F, animal: P, scenery: B, and other: O. In some embodiments, the type acquisition unit 231 is a component or part of (e.g., provided by) the server apparatus 2. In some embodiments, the type acquisition unit 231 may be configured by an external server and functions as an input unit that receives data indicating an image type. In other words, a configuration is possible in which the server apparatus 2 transmits image data to an external information processing apparatus, and things (e.g., objects and people) appearing in the image are classified by an image identification function of the information processing apparatus.

As another example, the type acquisition unit 231 can be configured using TensorFlow. TensorFlow is an open source platform for machine learning. TensorFlow can recognize objects that appear in an image included in image data. Upon receiving image data, the type acquisition unit 231 can output, as a percentage, the likelihood of what objects appearing in the image data are. For example, in the case of determining, through machine learning, that a leopard appears in image data, the type acquisition unit 231 can output that there is a 77% likelihood of a leopard, a 14% likelihood of a jaguar, a 6% likelihood of a cheetah, a 2% likelihood of a snow leopard, and a 1% likelihood of an Egyptian cat.

For example, the type acquisition unit 231 can also output (e.g., determine) the number of men shown in an image and the respective age range of the men. In the information processing system 10 according to some embodiments, the type acquisition unit 231 may be configured to output (e.g., determine) whether an object is a male or a female. The type acquisition unit 231 may also be configured to output whether there is one object or multiple objects.

Next, the count acquisition unit 232 may be configured to acquire count data that includes a reaction count and a specific reaction count. The reaction count is the number of reactions for the piece of content that received the most reactions from other users from among multiple pieces of content that were posted to a social media platform by the user. The specific reaction count is the number of reactions from other users for each predetermined type of image posted to a social media platform. It is sufficient that the count acquisition unit 232 acquires count data from an evaluation on the social media platform for the image in the image data for which the image type was acquired, for example. For example, the count acquisition unit 232 may obtain, as the reaction count, the highest number of "likes" that the user, who has posted images to the social media platform, has received from other users in the past. The reaction count can be called the highest "like" count, which indicates the highest number of "likes". The count acquisition unit 232 may also obtain, as the specific reaction count, the number of "likes" for an image (e.g., a specific image) posted to the social media platform, for example.

Figure 3:
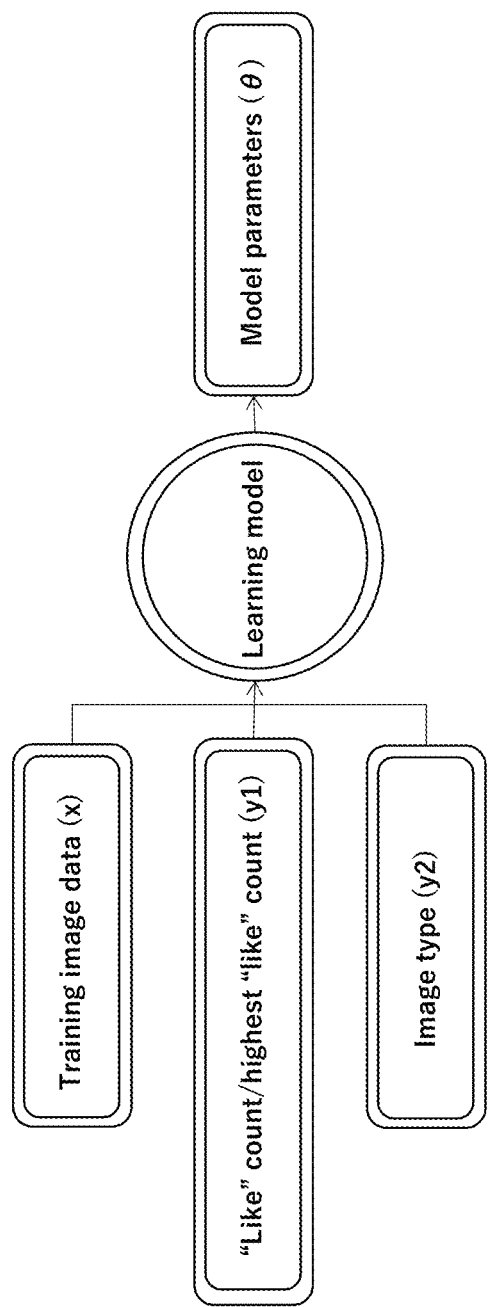
FIG. 3 is an illustrative diagram of an exemplary machine learning model that generates model parameters.

In order to perform machine learning, the prediction unit 233 is first given training data as input data. The prediction unit 233 can use result-reward machine learning. For example, as shown in FIG. 3, the training data includes training image data (x), a value (y1) obtained by dividing the "like" count by the highest "like" count, and an image type (y2). The training image data (x) can be image data that was posted to the social media platform in the past, for example. As another example, the training image data (x) can be image data that was posted to the social media platform within (e.g., during) a predetermined time period. The predetermined time period may be at least three months (e.g., within the last three months or between Jan. 1, 2020 and Mar. 31, 2020), for example. In the case of using images that were posted to the social media platform, it is preferable that the training image data (x) is image data that was posted when the follower count was a predetermined value or higher.

With respect to the value (y1) obtained by dividing the "like" count by the highest "like" count, the "like" count can be the specific reaction count, which indicates how many times other users reacted to the training image data (x) that was posted to the social media platform. Also, with respect to the value (y1) obtained by dividing the "like" count by the highest "like" count, the highest "like" count can be the highest number of times that other users reacted to a post on the social media platform. It is preferable that the reaction count is the highest "like" count with respect to content posted to the social media platform by the user in a predetermined period. In other words, the value (y1) obtained by dividing the "like" count by the highest "like" count can also be said to the evaluation of the image for which the "like" count was acquired. In FIG. 3, the value (y1) obtained by division of the "like" count by the highest "like" count is indicated as "like" count/highest 'like' count (y1)".

It is sufficient that the image type "y2" has been determined in advance in accordance with a predetermined reference. For example, as the predetermined reference, it may be determined whether an object appearing in the training image data (x) is a person, an animal, scenery, or food. Also, in the case where a person appears in the training image data (x), the number of people and their sexes may be determined.

In some embodiments, the prediction unit 233 can acquire three month's worth of image data that was posted to the social media platform, and use the acquired image data to generate machine learning model parameters (θ). In addition to the three month's worth of image data acquired from the social media platform, the prediction unit 233 can also receive an input of the "like" count and the highest "like" count, which indicate evaluations of the images, for example. The prediction unit 233 then assigns points to the images included in the image data. The prediction unit 233 is set such that an image is given the highest evaluation if it has been given 100 points.

In the generation of the learning model, it is sufficient that the server apparatus 2 receives, the actual values displayed on the social media platform as the "like" count and the highest "like" count that are attributes used in image determination. The highest "like" count is not limited to being the actual value, and may be obtained by performing predetermined statistical processing to calculate the likelihood of obtaining the highest number of "likes" for a certain follower count. The highest "like" count is not limited to being obtained by performing predetermined statistical processing to calculate the likelihood of obtaining the highest number of "likes" for a certain follower count, and may be obtained by performing machine learning to calculate the likelihood of obtaining the highest number of "likes" for a certain follower count.

As shown in FIG. 3, in the training of the learning model, the prediction unit 233 may receive an input of three types of data, namely the training image data (x), the value (y1) obtained by dividing the "like" count by the highest "like" count, and the image type (y2). The learning model receives an input of the training image data (x), the value (y1) obtained by dividing the "like" count by the highest "like" count, and the image type (y2). Upon receiving these three types of data, the learning model outputs model parameters (θ) for use in prediction. It is preferable that the prediction unit 233 is configured such that the updated model parameters (θ) are stored in the server storage unit 23 after machine learning has ended.

After creating the model parameters (θ) based on the training data, the prediction unit 233 saves the model parameters (θ) for use in prediction in an HDFS formatted file, for example. In order for the HDFS formatted file to be processed by TensorFlow, it is preferable that the prediction unit 233 converts the file to the pb file format using the KerasToTensorFlow library.

Figure 4:
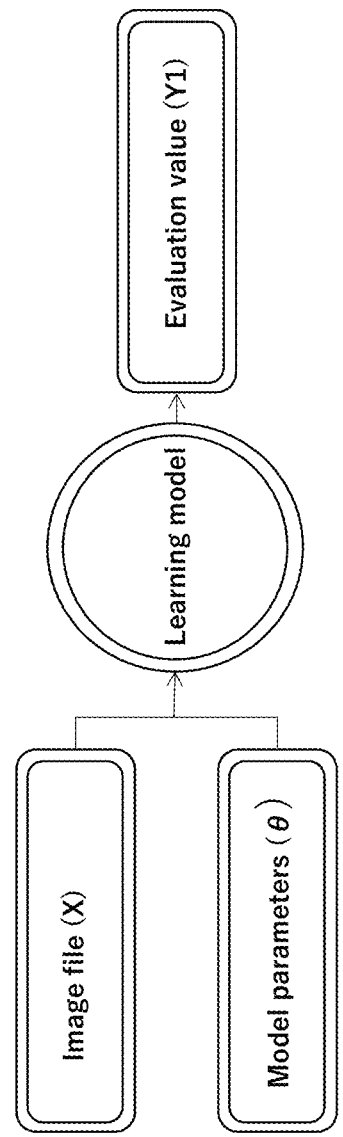
FIG. 4 is an illustrative diagram of machine learning in the exemplary learning model that uses model parameters.

Next, as shown in FIG. 4, in order to predict an evaluation for an image selected by the user, the prediction unit 233 may receive an input of an image file (X) that includes the user-selected image, and the model parameters (θ) obtained by machine learning based on the training data. The prediction unit 233 performs machine learning on the image file (X) using the learning model. The prediction unit 233 performs machine learning with use of the image file (X) including the user-selected image and the model parameters (θ) obtained by machine learning based on the training data, and thus outputs an evaluation value (Y1) for the image selected by the user. A configuration is possible in which, through performing machine learning with use of the image file (X) and the model parameters (θ), the prediction unit 233 further outputs the image type of the image in the image file (X) in addition to the evaluation value (Y1).

The server apparatus 2 is configured to output a "like" count and an image evaluation as the machine learning results. The "like" count and the image evaluation are basically correlated with each other. The server apparatus 2 is configured such that when the "like" count is the highest value, the evaluation value indicating the evaluation of the image is 100 points. In other words, the server apparatus 2 can display 100 points for an image that is predicted to surpass the current highest "like" count. For example, if the follower count is 1,000 people, the server apparatus 2 calculates 300 as the "like" count through machine learning. The count estimation unit 234 uses machine learning to calculate what the "like" count is when the follower count is a certain number of people. The count estimation unit 234 may use statistical data to calculate what the "like" count is when the follower count is a certain number of people. The count estimation unit 234 may be configured to use machine learning to calculate what the highest "like" count is when there is a certain number of followers. In addition to using machine learning to calculate the highest "like" count based on the follower count, the count estimation unit 234 may be configured to also statistically calculate what the highest "like" count approximately is based on the follower count. For example, the count estimation unit 234 can statistically calculate the value of the highest "like" count when the follower count is 1,000 people, and statistically calculate what the highest "like" count is when the follower count is 900 people.

In the exemplary information processing system 10 according to some embodiments, the count estimation unit 234 of the server apparatus 2 may use statistical data to calculate the highest "like" count for a predetermined follower count. The server apparatus 2 may associate learning data with image data and "like" counts that have been received from a specific social media platform by the server communication unit 21 in a pre-set time period, and store the associated data in a database in the server storage unit 23.

For example, the count estimation unit 234 can use machine learning to calculate that when the follower count on the social media platform is 1000 people, the highest "like" count is estimated to be the value of 350. Also, besides machine learning, the count estimation unit 234 can use statistical processing to calculate that when the follower count on the social media platform is 1000 people, the highest "like" count is estimated to be the value of 350. This statistical processing may be configured to obtain the correlation between the follower count and the highest "like" count. The follower count and the highest "like" count tend to have a relationship in which the higher the follower count is, the higher the highest "like" count is. However, the follower count and the highest "like" count can possibly have a relationship in which the lower the follower count is, the higher the highest "like" count is. For example, the follower count and the highest "like" count can have a relationship in which when the follower count is low at around 100 people, the "like" count is 80. The follower count and the highest "like" count can possibly have a relationship in which the highest "like" count does not increase proportionally with an increase in the follower count.

The follower count and the highest "like" count can possibly have a relationship in which, for example, when the follower count is high at around 5000 people, the "like" count is not 5000, but rather is approximately 800. The relationship between the follower count and the highest "like" count is thought to be this way because the higher the follower count is, the weaker the relationship with the other users is.

The server storage unit 23 includes a volatile storage apparatus in which information disappears when the power supply is turned off, and a non-volatile storage apparatus in which information does not disappear even if the power supply is turned off. The volatile storage apparatus temporarily stores information that is processed by the server control unit 22. One example of the volatile storage apparatus is a RAM. The non-volatile storage apparatus is a storage apparatus that can store various types of information processing programs and various types of information. One example of the non-volatile storage apparatus is a ROM. Specifically, the non-volatile storage apparatus is a storage apparatus that can store a program for machine learning.

The following describes overall operations of the information processing system 10 according to some embodiments. First, the relationship between the terminal apparatus 1 and the server apparatus 2 will be described.

Figure 5:
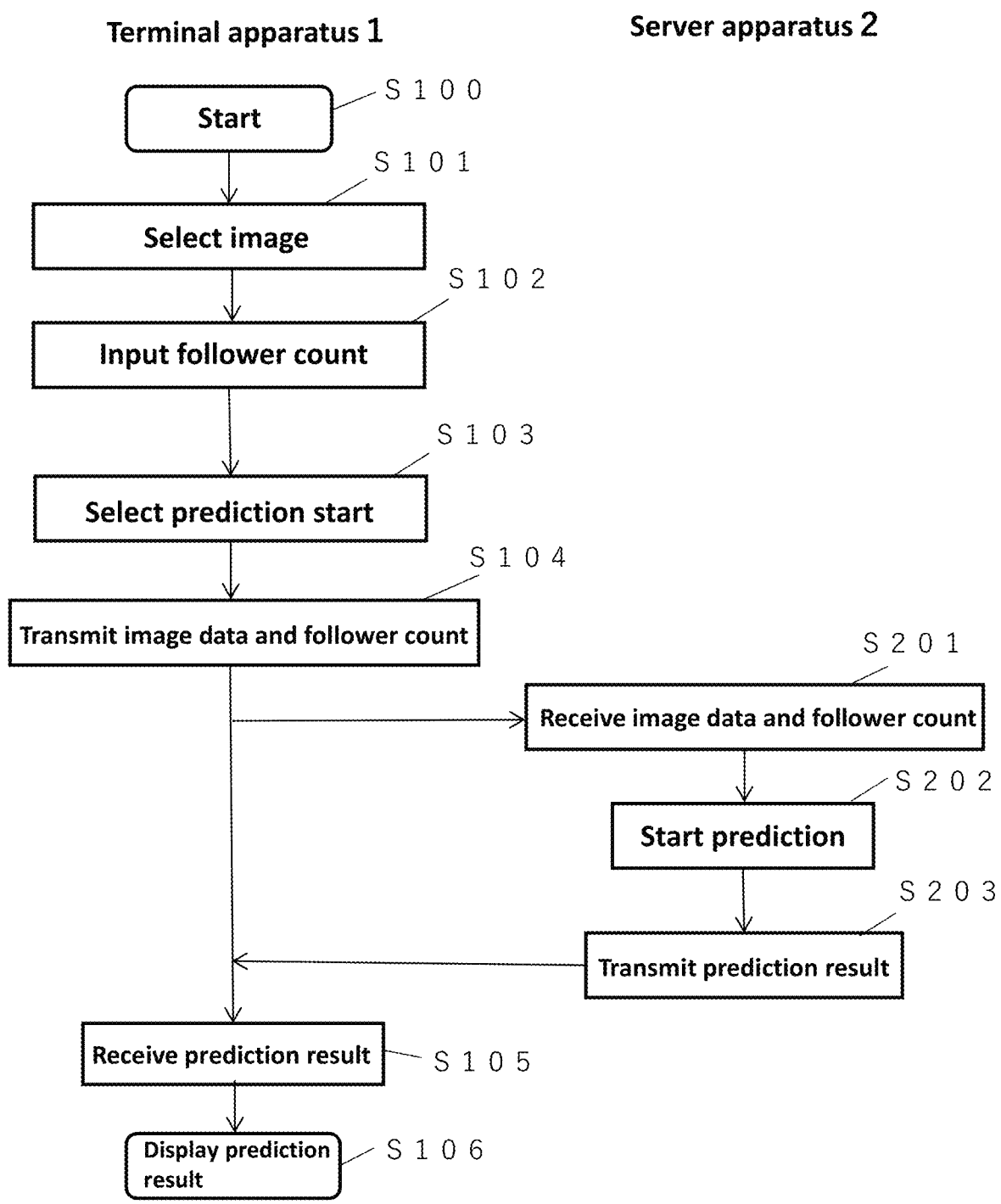
FIG. 5 is a flowchart of exemplary processing performed by a terminal apparatus and a server apparatus according to some embodiments.

In the exemplary information processing system 10 according to some embodiments, in the terminal apparatus 1, the launching of software is started as shown in FIG. 5 by launching a software application stored in the storage apparatus 16 (step 100). Hereinafter, steps are sometimes indicated by the letter S.

Next, in the information processing system 10, the user uses the input apparatus 13 of the terminal apparatus 1 to select, from among multiple images, the image for which an evaluation is to be predicted (S101).

Also, information indicated the follower count of the predetermined user is input to the input apparatus 13 of the terminal apparatus 1 (S102). Note that image selection and the input of the follower count may be performed in either order.

Next, in the terminal apparatus 1, the input apparatus 13 accepts a prediction start instruction for transmitting the image data that includes the selected image and the information indicating the follower count of the predetermined user (S103). When the prediction start instruction for transmitting the image data and the follower count is accepted by the input apparatus 13, the terminal apparatus 1 causes the communication apparatus 14 to transmit the image data and the follower count information to the server apparatus 2 (S104).

If the terminal apparatus 1 receives, from the server apparatus 2, a prediction result that includes an evaluation of the image predicted based on the image data and the follower count (S105), the prediction result is displayed by the display apparatus 15 (S106).

The following describes operations performed by the server apparatus 2 upon receiving the image data and the follower count information from the terminal apparatus 1.

The server apparatus 2 has been placed in a state capable of evaluating an image. Among the steps performed by the server apparatus 2, the server apparatus 2 first receives the image data and the follower count information from the terminal apparatus 1 (S201). The server apparatus 2 stores the received image data and follower count information in the server storage unit 23. Upon receiving the image data and the follower count information, the server apparatus 2 starts the prediction of an evaluation of the image (S202).

With use of a machine learning program that is controlled by the server control unit 22, the server apparatus 2 acquires a prediction result regarding the evaluation of the image. The server apparatus 2 then transmits the acquired prediction result to the terminal apparatus 1 (S203).

The following describes transitions between screens on the terminal apparatus 1 in the information processing system 10 according to some embodiments.

Figure 6:
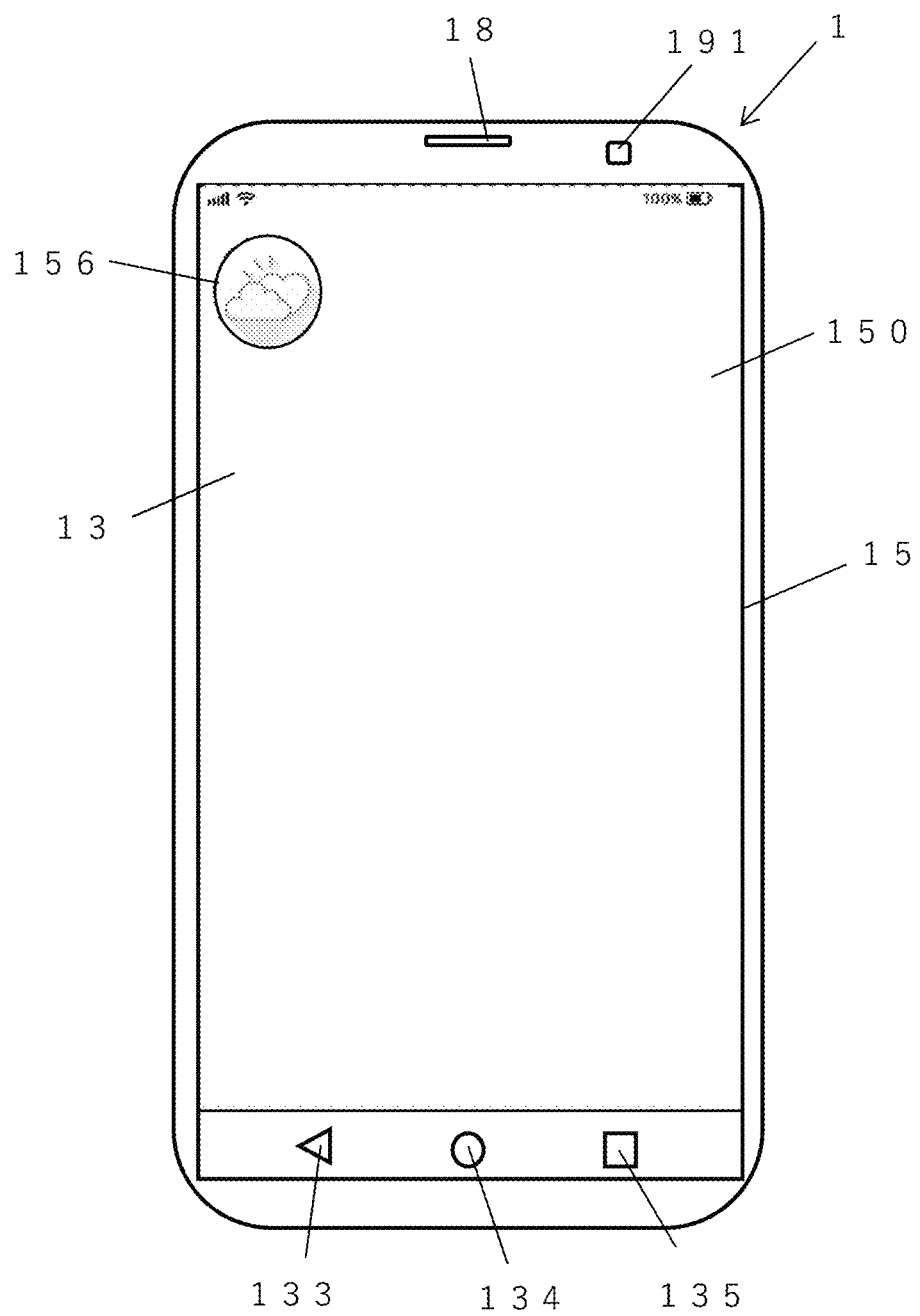
FIG. 6 is an illustrative diagram of an exemplary home screen of the terminal apparatus according to some embodiments.

As shown in FIG. 6, in the exemplary information processing system 10 according to some embodiments, an application icon 156 is displayed on a home screen 150 of the display apparatus 15 of the terminal apparatus 1. If the user touches the application icon 156 on the home screen 150, the input apparatus 13 integrated with the display apparatus 15 in the terminal apparatus 1 senses the touch operation performed by the user. When the input apparatus 13 senses the touch operation performed by the user, the terminal apparatus 1 launches a software application stored in the storage apparatus 16.

Note that in the information processing system 10 according to some embodiments, the terminal apparatus 1 may be configured by a smartphone. Examples of touch operations include a tap operation, a flick operation, a slide operation, and a swipe operation. The front face of the smartphone is provided with a mobile phone ear piece 18 and a camera 191 of the image capturing apparatus 12. On the front face of the smartphone, the display apparatus 15 displays a back button 133 for returning to the immediately previous state, a home button 134 for returning to the home screen, and a menu button 135 for displaying a list of software applications.

Figure 7:
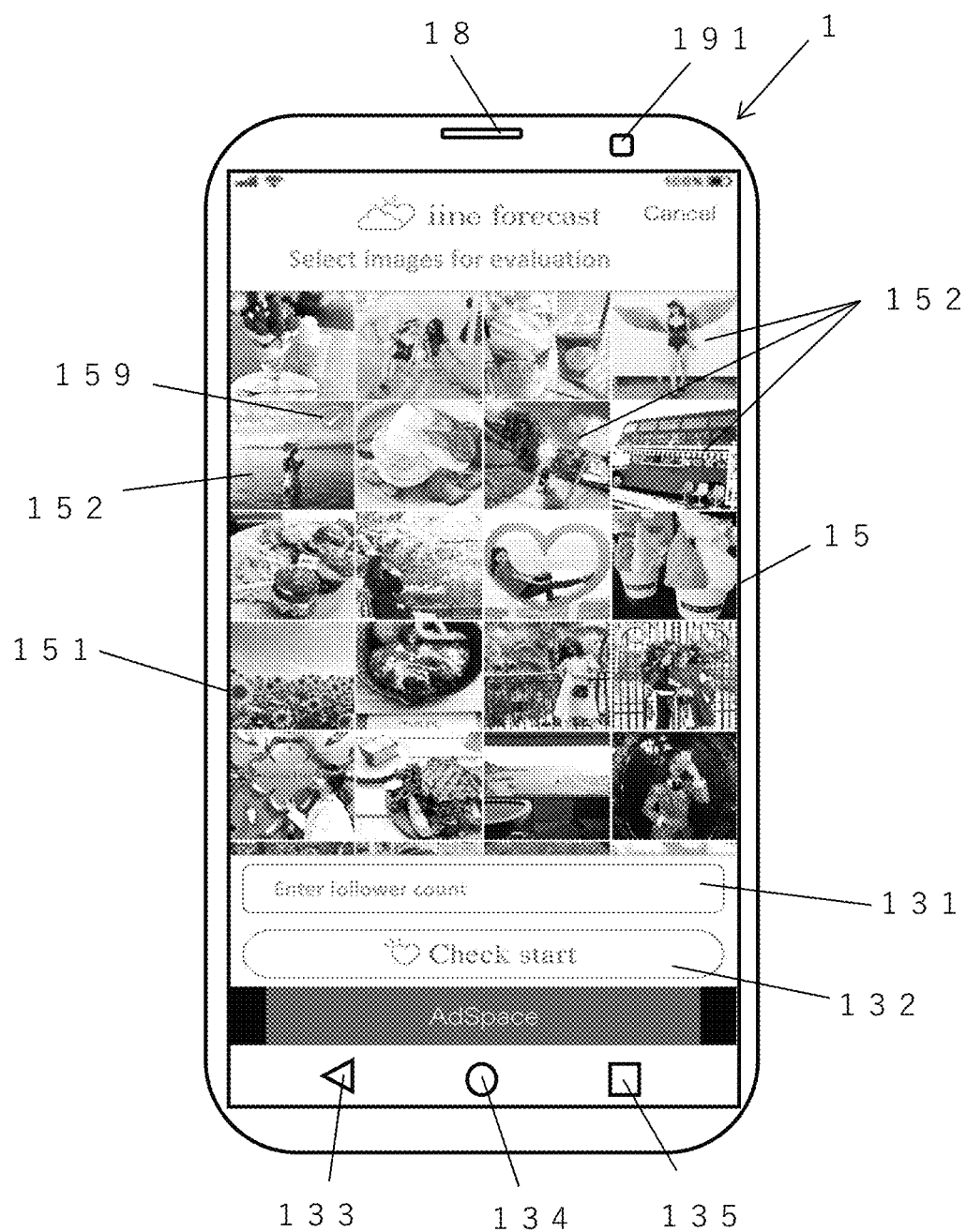
FIG. 7 is an illustrative diagram of an exemplary input screen of the terminal apparatus according to some embodiments.

In the terminal apparatus 1, when the control apparatus 17 launches the software application stored in the storage apparatus 16, a selection screen 151 shown in FIG. 7 is displayed on the display apparatus 15. If image data for multiple photographs 152 taken by the user is already stored in the storage apparatus 16, the photographs 152 are displayed in the selection screen 151 in a matrix in order of most recent image data from the top left to the bottom right.

In the terminal apparatus 1, when the user touches one of the photographs 152 for which a predicted image evaluation is desired, a checkmark 159 is displayed on the touched photograph. In the information processing system 10 of some embodiments, if the terminal apparatus 1 includes a touch panel for example, when a photograph 152 displayed on the display apparatus 15 is touched, the input apparatus 13 can store a flag in the storage apparatus 16 in association with the image data corresponding to the photograph 152 that was selected by the touch operation.

The user can input their follower count into an input box 131. In the terminal apparatus 1, after the checkmark 159 and the follower count have been input, if a check start button 132 is touched, a prediction start instruction is accepted. In other words, the terminal apparatus 1 is configured such that when the user selects one or more of the photographs 152 displayed on the display apparatus 15, pieces of image data corresponding to the selected photographs 152 are transmitted from the communication apparatus 14 to the server apparatus 2.

Figure 8:
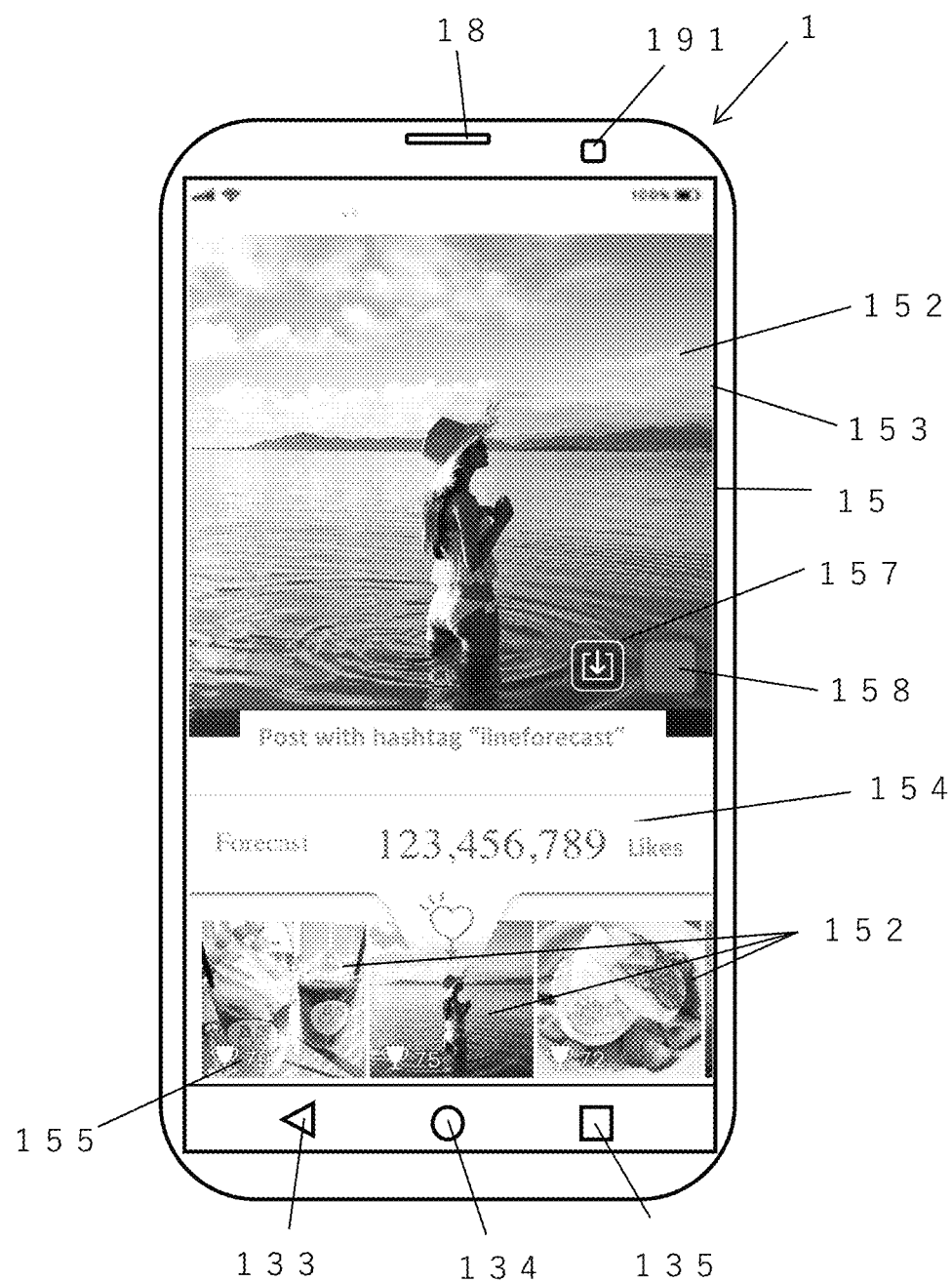
FIG. 8 is an illustrative diagram of an exemplary prediction result screen of the terminal apparatus according to some embodiments.

Next, when the terminal apparatus 1 receives a prediction result from the server apparatus 2, a result screen 153 shown in FIG. 8 is displayed on the display apparatus 15. In the result screen 153, the photographs 152 for which an image evaluation was predicted by the server apparatus 2 are displayed in a row at the lower portion of the display apparatus 15. In the result screen 153, the same photograph 152 displayed as the center photograph 152 in the row of photographs 152 is displayed at a large size at the upper portion of the display apparatus 15. In FIG. 8, three photographs 152 are displayed in a row at the lower portion of the result screen 153. In the result screen 153, a predicted count 154, which is based on the evaluation value (Y1) of the enlarged photograph 152, is displayed between the enlarged photograph 152 and the row of three photographs 152. Also, in the result screen 153, an evaluation score 155 indicating the evaluation value (Y1) is displayed in the lower left portion of each of the photographs 152 in the row. By simply looking at the evaluation scores 155, the user can estimate which of the photographs 152 will receive a higher "like" count if posted to a social media platform.

In other words, the terminal apparatus 1 is configured such that the same image data as the enlarged image is displayed at a smaller scale below the enlarged image on the display apparatus 15. In the terminal apparatus 1, other images are also displayed on the left and the right of the reduced image on the display apparatus 15. The terminal apparatus 1 may be configured such that the user can perform a touch operation to move the images displayed on the display apparatus 15. For example, in the terminal apparatus 1, when the user performs a slide operation, the image that is displayed at the center in the lower portion of the result screen 153 is enlarged in the upper portion of the result screen 153 on the display apparatus 15.

Also, the terminal apparatus 1 is configured such that if the user slides the row of three photographs 152 to the left or right, the photographs 152 move to the left or right in accordance with the slide operation. In this configuration, when the photographs 152 in the result screen 153 are moved, the same photograph 152 as whichever photograph 152 is at the center of the row is enlarged in the upper portion of the result screen 153. While displaying the enlarged photograph 152, the terminal apparatus 1 also displays the predicted count 154 that is based on the evaluation value (Y1) and indicates the "like" count that has been predicted for the enlarged image.

A save icon 157 and a post icon 158 are provided in the lower right portion of the enlarged photograph 152 in the result screen 153. The save icon 157 may be configured to allow the user to re-save, to the storage apparatus 16, the photographs 152 that the user desires to post to a social media platform.

If there are multiple photographs 152 that are similar to the photograph 152 that was selected by the user for posting to a social media platform, it may become unclear which of the photographs 152 has the highest evaluation value (Y1). The terminal apparatus 1 stores the photographs 152 to the storage apparatus 16 in chronological order. In the terminal apparatus 1, due to re-saving whichever one of the similar photographs is the photograph 152 that the user desired to post to the social media platform, that photograph becomes the chronologically newest photograph 152 and can be displayed at a high position easily seen by the user.

The information processing system 10 is not limited to a configuration in which image data captured by the terminal apparatus 1 is transmitted to the server apparatus 2, and the evaluation value (Y1) predicated by the server apparatus 2 is displayed by the terminal apparatus 1. The information processing system 10 can perform evaluation at different timing from image capturing, for example. For example, the information processing system 10 may directly evaluate an image on a social media platform in accordance with an instruction from a personal computer.

As described above, in the information processing system 10 of some embodiments, in the server apparatus 2, a program causes a computer to function as the type acquisition unit 231, the count acquisition unit 232, the count estimation unit 234, and the prediction unit 233. The type acquisition unit 231 acquires the type of an image included in image data. The count acquisition unit 232 acquires count data. The count data includes a reaction count and a specific reaction count. The reaction count is the number of reactions for the piece of content that received the most reactions from other users from among multiple pieces of content that were posted to a social media platform by the user. The specific reaction count is the number of reactions from other users for each predetermined type of image posted to a social media platform. The count estimation unit 234 estimates a potential count in accordance with a follower count. The potential count is a value that indicates the likelihood of receiving reactions from other users for a piece of content posted to a social media platform by a predetermined user. Based on the image type, the count data, and the potential count, the prediction unit 233 can acquire a predicted count that indicates a prediction of reactions based on the follower count of the predetermined user.

Also, the information processing method of the information processing system 10 of some embodiments has a type acquiring step, a count acquiring step, a count estimating step, and a predicting step. In the type acquiring step, the type of an image included in image data is acquired. In the count acquiring step, count data is acquired. The count data includes a reaction count and a specific reaction count. The reaction count is the number of reactions for the piece of content that received the most reactions from other users from among multiple pieces of content that were posted to a social media platform by the user. The specific reaction count is the number of reactions from other users for each predetermined type of image posted to a social media platform. In the count estimating step, a potential count, which is a value that indicates the likelihood of receiving reactions from other users for a piece of content posted to a social media platform by a predetermined user, is acquired based on a follower count. In the predicting step, a predicted count, which indicates a prediction of reactions based on the follower count of the predetermined user, is acquired based on the image type, the count data, and the potential count.

In another aspect of the information processing system 10 according to some embodiments, it is possible to use hashtags, and this will be described below.

In the information processing system 10, hashtags given to content posted to a social media platform may be used to improve the precision in image classification. In addition to image data, the "like" count, and the follower count, the server apparatus 2 may further collect hashtags included in the body of a posted photograph 152.

Hashtags include words (e.g., text) input by the user. A hashtag may include components such as single words, combinations of words, or subjects and predicates. Hashtags are used by the external information processing apparatus 3 that constitutes the social media platform. Hashtags are used as tags given to posts on the social media platform.

A hashtag includes a predefined symbol (e.g., hash mark, #) followed by one or more words, for example. For example, if the user wishes to view various cake-related posts, the user can input "#cake" to the search engine of the social media platform in order to display a list of newest cake-related posts. Even if the body of a post on the social media platform does not include the word "cake" and is simply an image, the server apparatus 2 can use the cake hashtag to identify that the image posted to the social media platform is a cake-related image. In other words, by using hashtags, the server apparatus 2 can relatively simply identify an image posted to the social media platform as a specific image that is interesting or appealing to the user.

The hashtag may be constituted by text data. The hashtag may include a phrase. The phrase may be a single word, or may be a group of words. The text data of the hashtag is converted into a format that can be handled by a machine. The hashtag is decomposed into word units through morphological analysis. In this morphological analysis, the hashtag can be classified into smallest units that have significance in natural language. With this morphological analysis, it is possible to acquire part-of-speech information regarding the classified morphemes. For example, with this morphological analysis, it is also possible to acquire information indicating whether a word included in the hashtag is a noun, an adjective, a verb, or an adverb.

In another aspect, a morphological analysis engine such as MeCab can be used for the morphological analysis. MeCab can be used together with a named entity dictionary.

Examples of the unique expression dictionary include a system dictionary such as Neologd.

The type acquisition unit 231 can identify the type of an image (e.g., an image type for the image) in image data from a hashtag. The type acquisition unit 231 may use a hashtag acquired from the social media platform to identify the type of the image in the image data. For example, the type acquisition unit 231 identifies a hashtag in a body that was input to the social media platform. The type acquisition unit 231 performs morphological analysis on the body and then extracts hashtags, which are separated by hash marks and spaces between the words that follow the hash marks. Similarly, a hashtag may be input to the prediction unit 233. The prediction unit 233 can use the hashtag to identify the type of image included in the input image data.

In yet another aspect of the information processing system 10 according to some embodiments, a moving image (e.g., live image, gif, or video) may be evaluated instead of a still image.

By performing object detection processing for example, it is possible to extract change of an object in a moving image. For example, in the information processing system 10, in the case where the server apparatus 2 predicts the "like" count for a moving image, audio information can be used as supplementary information in order to improve the precision of the prediction of the "like" count. In the case of a moving image, the information processing system 10 can predict the "like" count in units of a predetermined frame rate. As one example of the predetermined frame rate, it is possible to perform image processing every second or every 10 frames. Also, in the case of a moving image, the information processing system 10 can predict the "like" count for a set of images. Moreover, in the case of a moving image, the information processing system 10 may extract an object in a predetermined frame, and predict the "like" count based on movement of the extracted object.

Additional embodiments of the present disclosure will be described in detail below with reference to the drawings depicting exemplary system 20. An information processing system 20 according to some embodiments make use of model parameters (θ) that are similar to those described above. The information processing system 20 of some embodiments is configured to be capable of assisting a search for a spot where an "appealing" photographic image can be taken in order to obtain a large number of reactions from other users on an SNS.

Figure 9:
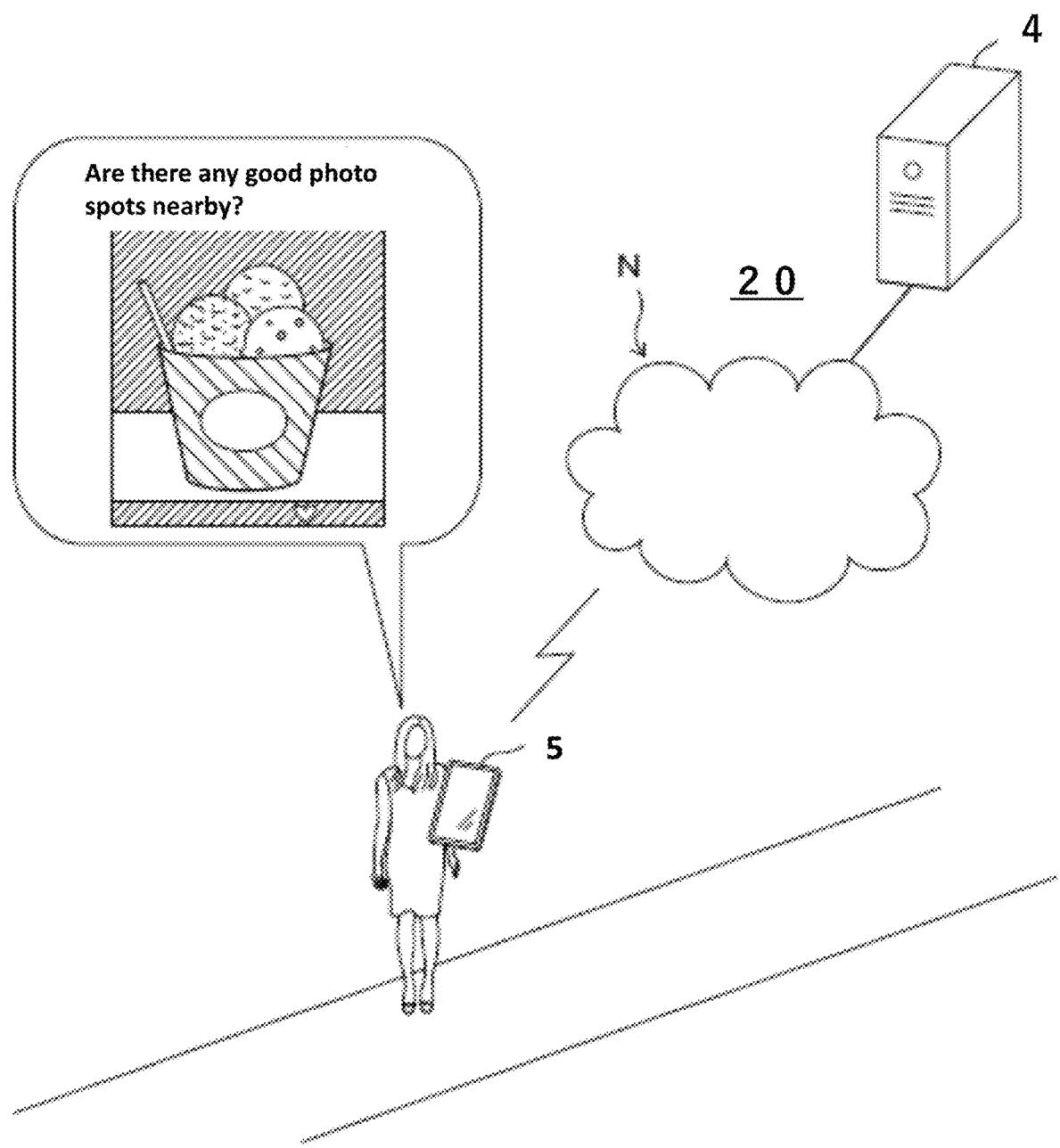
FIG. 9 is a schematic diagram of an exemplary information processing system of additional embodiments.

FIG. 9 is a schematic diagram of the exemplary information processing system 20 of certain embodiments. The information processing system 20 includes an information processing apparatus 4 and an information terminal apparatus 5. The information processing apparatus 4 and the information terminal apparatus 5 can transmit and receive data via a network N. In the information processing system 20 of some embodiments, the information processing apparatus 4 may correspond to the server apparatus 2 of the described herein, and the information terminal apparatus 5 may correspond to the terminal apparatus 1 described herein.

A server computer may be used as the information processing apparatus 4. The information processing apparatus 4 provides information regarding a spot (e.g., location) where an "appealing" photographic image can be taken, in accordance with an inquiry from the information terminal apparatus 5. The information terminal apparatus 5 may be an information terminal apparatus used by a user. The information terminal apparatus 5 can exchange data with the information processing apparatus 4 through communication.

In the exemplary information processing system 20, the information terminal apparatus 5 can be used to receive, from the information processing apparatus 4, information that indicates a spot (e.g., a location, such as a view point, a store, or a GPS location) where there is a high likelihood of being able to take an "appealing" photographic image or moving image (e.g., gif, video, video clip, or live image) in the vicinity of the location of the user at that time (e.g., current location of the user at the current time) or the location to which the user is heading (e.g., a destination location). The location of the user can also be said to be the current location. The location to which the user is heading can also be said to be the destination. The information processing apparatus 4 may collect, from the Internet, multiple pieces of image or moving image data that is associated with location data indicating locations in a specified range that includes a location designated by the user. The information processing apparatus 4 then may calculate evaluation values for the collected pieces of image or moving image data. Based on the evaluation values, the information processing apparatus 4 may transmit, to the information terminal apparatus 5, search results that include spots corresponding to the pieces of location data that are associated with image data that was evaluated as receiving a large number of reactions on a SNS. The information terminal apparatus 5 then may display the search results received from the information processing apparatus 4 as a list of spots where an "appealing" photographic image or moving image can be taken. The information terminal apparatus 5 may display the search results received from the information processing apparatus 4 as spots on a map image where an "appealing" photographic image or moving image can be taken.

Accordingly, the user can easily find spots where an "appealing" photographic image or moving image can be taken in the vicinity of the current location or a designated destination.

The following describes the exemplary configuration of the information processing system 20 and the detailed content of exemplary processing performed by the information processing system 20.

Figure 10:
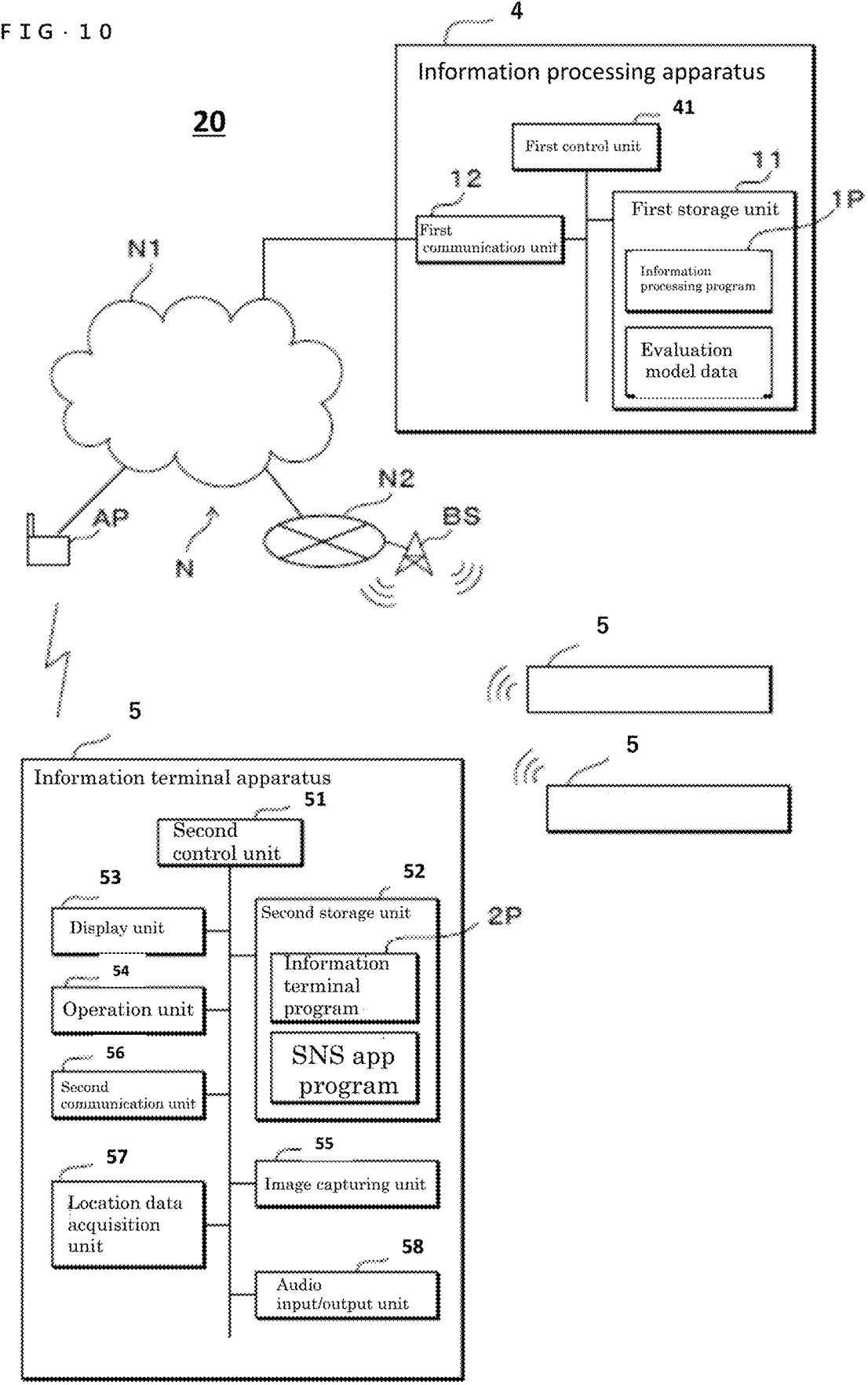
FIG. 10 is a block diagram showing an exemplary configuration of an information processing apparatus and an information terminal apparatus according to additional embodiments.

FIG. 10 is a block diagram showing the exemplary configuration of the information processing apparatus 4 and the information terminal apparatus 5. A server computer is used as the information processing apparatus 4. The information processing apparatus 4 includes a first control unit 41, a first storage unit 42, and a first communication unit 43.

The first control unit 41 is a processor that employs a CPU (Central Processing Unit) and/or a GPU (Graphics Processing Unit), and executes processing for controlling various constituent elements with use of a memory such as a built-in ROM (Read Only Memory) and RAM (Random Access Memory). The first control unit 41 may be configured by a single piece of hardware (SoC: System On a Chip) in which the processor, the memory, the first storage unit 42, and the first communication unit 43 are integrated. Based on an information processing program 1P stored in the first storage unit 42, the first control unit 41 causes a general-purpose server computer to function as the unique information processing apparatus 4 that provides information on spots where an "appealing" photographic image can be taken.

A non-volatile storage medium can be used as the first storage unit 42. The non-volatile storage medium can be a hard disk or an SSD (Solid State Drive), for example. The first storage unit 42 stores programs and data that are referenced by the first control unit 41, including the information processing program 1P.

The first storage unit 42 may store learned parameters and definition data regarding an evaluation model 1M. The first storage unit 42 may also store map information.

The first communication unit 43 may be a communication module that realizes communication with the information terminal apparatus 5 via the network N. The network N may include a public telecommunication network N1 or a carrier network N2. The network N is a more detailed description of the public telecommunication network NO of the information processing system 10 according to some embodiments. The first communication unit 43 is a network card, a Wi-Fi (registered trademark) compatible wireless communication device, or a carrier communication module, for example. The first communication unit 43 has output functionality, and can also be called an output unit. The first communication unit 43 may be configured to transmit, to the information terminal apparatus 5, screen information that indicates spots where an image having a high evaluation value can be taken.

A general-purpose information processing terminal can be used as the information terminal apparatus 5. The information processing terminal is a smartphone, a connectivity-capable camera, or a tablet terminal, for example. The information processing terminal may be a personal computer, but preferably includes a wireless communication device and is portable. The information terminal apparatus 5 includes a second control unit 51, a second storage unit 52, a display unit 53, an operation unit 54, an image capturing unit 55, a second communication unit 56, a location data acquisition unit 57, and an audio input/output unit 58.

In another aspect, the second control unit 51 is a processor that employs a CPU and/or a GPU. The second control unit 51 executes processing for controlling various constituent elements with use of a memory such as a built-in read-only memory (ROM) or random-access memory (RAM). The second control unit 51 may be configured by a single piece of hardware (e.g., a system on a chip (SoC)) in which the processor, the memory, the second storage unit 52, the location data acquisition unit 57, and the second communication unit 56 are integrated. The second control unit 51 executes processing based on an information terminal program 2P stored in the second storage unit 52.

A non-volatile storage medium can be used as the second storage unit 52. The non-volatile storage medium is a solid state drive (SSD) or a flash memory, for example. The second storage unit 52 stores programs and data that are referenced by second control unit 51, including the information terminal program 2P. It is preferable that the second storage unit 52 stores an SNS application program (e.g., an application or program for a social networking platform or a social networking service) and account information used by the user.

The display unit 53 is a display apparatus. Examples of the display apparatus include a liquid crystal panel and an organic EL display. The operation unit 54 is an input/output apparatus that accepts input operations. Examples of the input/output apparatus include a keyboard, a pointing device, an in-display touch panel device, a speaker, and a microphone. The operation unit 54 may recognize operation content based on input audio received by the microphone, and accept operations in an interactive format with audio output by the speaker. In the case of recognizing operation content based on input audio received by the microphone and accepting operations in an interactive format with audio output by the speaker, the operation unit 54 may be configured by the audio input/output unit 58. The operation unit 54 may accept an input of a destination from the user. The operation unit 54 may also accept a designation of a range from the user. The operation unit 54 may further accept a selection of an image type from the user.

The image capturing unit 55 may be configured to capture one or more images (e.g., a still-image, moving images, video, or a live image) of an object. The image capturing unit 55 includes an image sensor. The image sensor is a CCD (Charge Coupled Device) image sensor or a CMOS (Complementary MOS) image sensor, for example. The image capturing unit 55 has a built-in image processing engine that may be configured by the semiconductor device. The image capturing unit 55 performs image processing on data that was acquired using the image sensor, and outputs image data or moving image data (e.g., image data for the moving image). The image data or moving image data output by the image capturing unit 55 is broadly interpreted to include captured image data (or captured moving image data), modified data obtained by modifying the captured image data, and metadata related to the captured image data.

As one example, a GPS reception apparatus can be used as the location data acquisition unit 57. The location data acquisition unit 57 is not limited to being a GPS reception apparatus. For example, the location data acquisition unit 57 may derive the location of the information terminal apparatus 5 with use of information from a mobile phone base station. The GPS reception apparatus derives the location of the information terminal apparatus 5 based on signals received from GPS (Global Positioning System) satellites. The second control unit 51 can specify the location of the information terminal apparatus 5 with use of the location data acquisition unit 57.

The second communication unit 56 is a communication device that may realize communication via the network N. The second communication unit 56 is a network card, a Wi-Fi (registered trademark) compatible wireless communication device, or a carrier communication module, for example. The second communication unit 56 may function as a transmission unit that transmits acquired location data.

Figure 11:
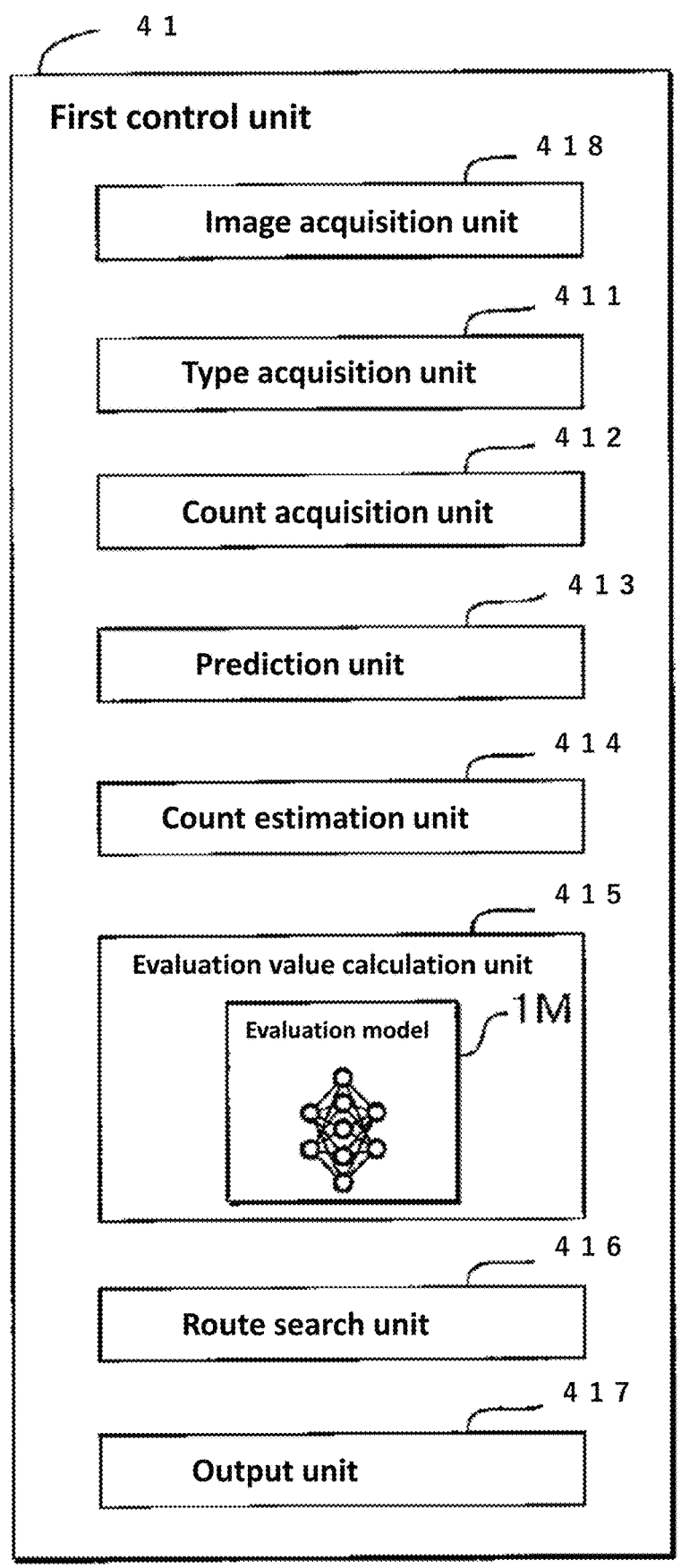
FIG. 11 is an exemplary functional block diagram of the information processing apparatus according to additional embodiments.

FIG. 11 is a functional block diagram of the exemplary information processing apparatus 4. The first control unit 41 of the information processing apparatus 4 may be configured to function as an image acquisition unit 418, a type acquisition unit 411, a count acquisition unit 412, a prediction unit 413, an evaluation value calculation unit 415, a route search unit 416, and an output unit 417, based on the information processing program 1P. The first control unit 41 may also be configured to function as a count estimation unit 414.

The image acquisition unit 418 acquires image data that may be associated with location data indicating a location that is included in a specified range that includes a designated location, from the public telecommunication network N1 via the first communication unit 43.

The type acquisition unit 411 acquires the image type of an image. Examples of image types include "food", "scenery", and "animal". As will be described later, the type acquisition unit 411 acquires a result of identifying (e.g., determining) the type of an object appearing in the image with use of an identification model 13M shown in FIG. 13. The image types are not limited to being "food", "scenery", and "animal", and may also include "person", "car", "bicycle", and "building", for example. There may be more detailed image types. In the case of "person", examples of more detailed image types include "male", "female", "adult", and "child". In the case of "food", examples of more detailed image types include "drink" and "cake". The identification model 13M is trained to, upon receiving image data, output identification information indicating any of various pre-set types, and a score indicating the likelihood of the identified type.

The count acquisition unit 412 acquires, from the information terminal apparatus 5, count data that includes a reaction count and a specific reaction count for an image or moving image posted by the user with the SNS application used by the user. The reaction count is the number of reactions for the piece of content that received the most reactions from other users from among multiple pieces of content that were posted to the SNS by the user. For example, the reaction count is the number of "likes". The specific reaction count is the number of reactions from other users for each type of image posted to the SNS. The prediction unit 413 predicts an evaluation value of the image based on the image type and count data.

In another aspect, the count estimation unit 414 estimates a potential count in accordance with a follower count for the SNS application used by the user. The potential count indicates the likelihood of receiving reactions from other users for a piece of content that is to be posted to the SNS by the user. The prediction unit 413 can acquire a predicted count that indicates a predicted number of reactions to a posted image from the follower count of the user, based on the evaluation value calculated by the evaluation value calculation unit 415 for the image and the potential count.

The evaluation value calculation unit 415 outputs the evaluation value for the input image. The evaluation value calculation unit 415 may include the functionality of an evaluation model 1M that has been trained to, upon receiving designated image data, outputting, for each user, an evaluation value that corresponds to a predicted count indicating the number of reactions predicted to be received from other users in the case of posting the input image data.

In another aspect, the route search unit 416 uses map information stored in the first storage unit 42 to find a route from a designated location to a specified location, and outputs route information.

Based on the evaluation values calculated by the evaluation value calculation unit 415 for input images and the location data that corresponds to the images, the output unit 417 creates and outputs screen information that indicates spots where there is a high likelihood of being able to capture an image that has a higher evaluation value. The output unit 417 transmits the created screen information to the information terminal apparatus 5 with use of the first communication unit 43.

Figure 12:
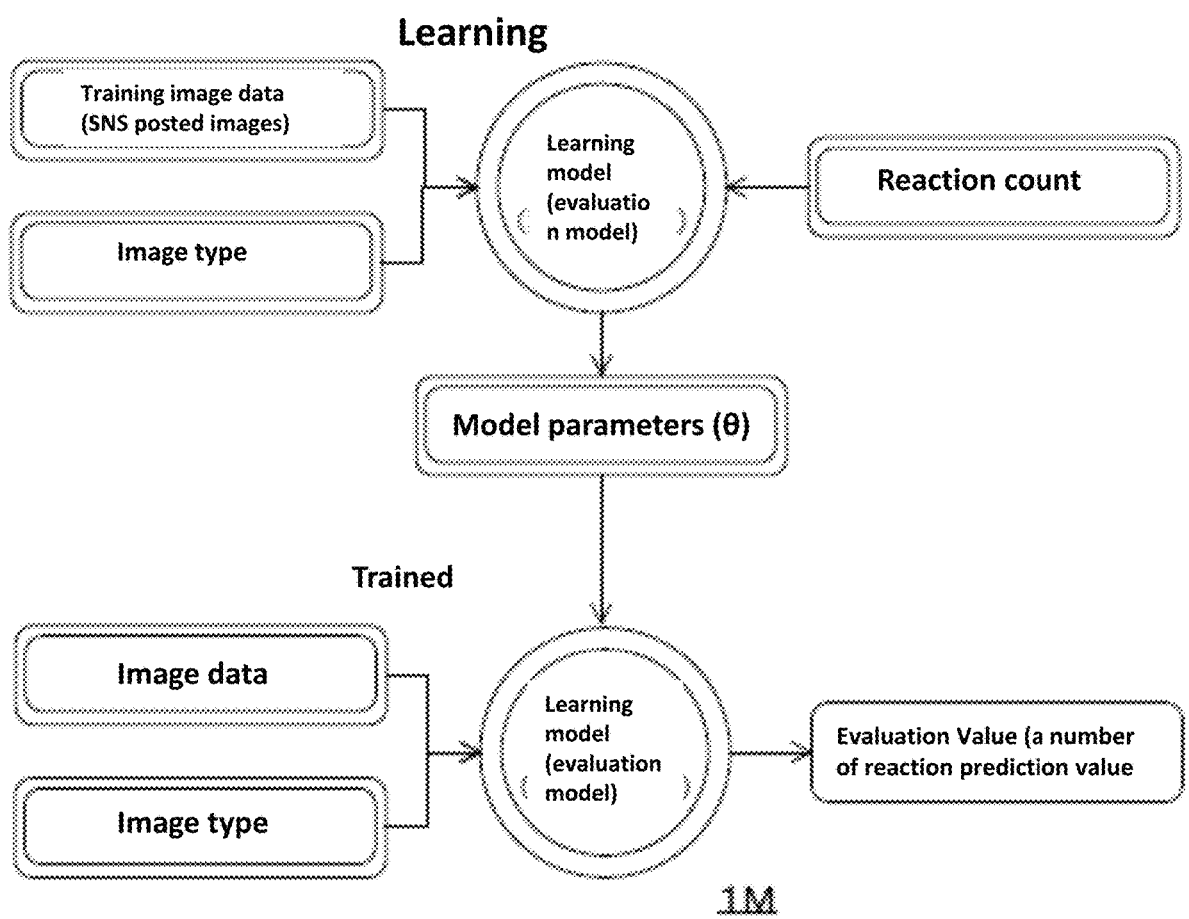
FIG. 12 is an illustrative diagram of an exemplary evaluation model according to additional embodiments.

The following is a more detailed description of the exemplary evaluation model 1M. FIG. 12 is a schematic diagram of the exemplary evaluation model 1M. The evaluation model 1M is generated and trained through deep learning using a neural network. The evaluation model 1M receives image data regarding images posted to an SNS as training image data. The evaluation model 1M preferably also receives image types that correspond to the pieces of input image data. Using actual reaction counts for the pieces of training image data as training data, the evaluation model 1M is trained to output evaluation values that correspond to the reaction counts when such image data is input. As the training proceeds, learned model parameters $\theta$ are obtained and stored in the first storage unit 42.

Through applying the learned model parameters $\theta$ to a defined neural network, the evaluation model 1M can output evaluation values that correspond to the likelihood of receiving SNS reactions when image data and image types are input.

Figure 13:
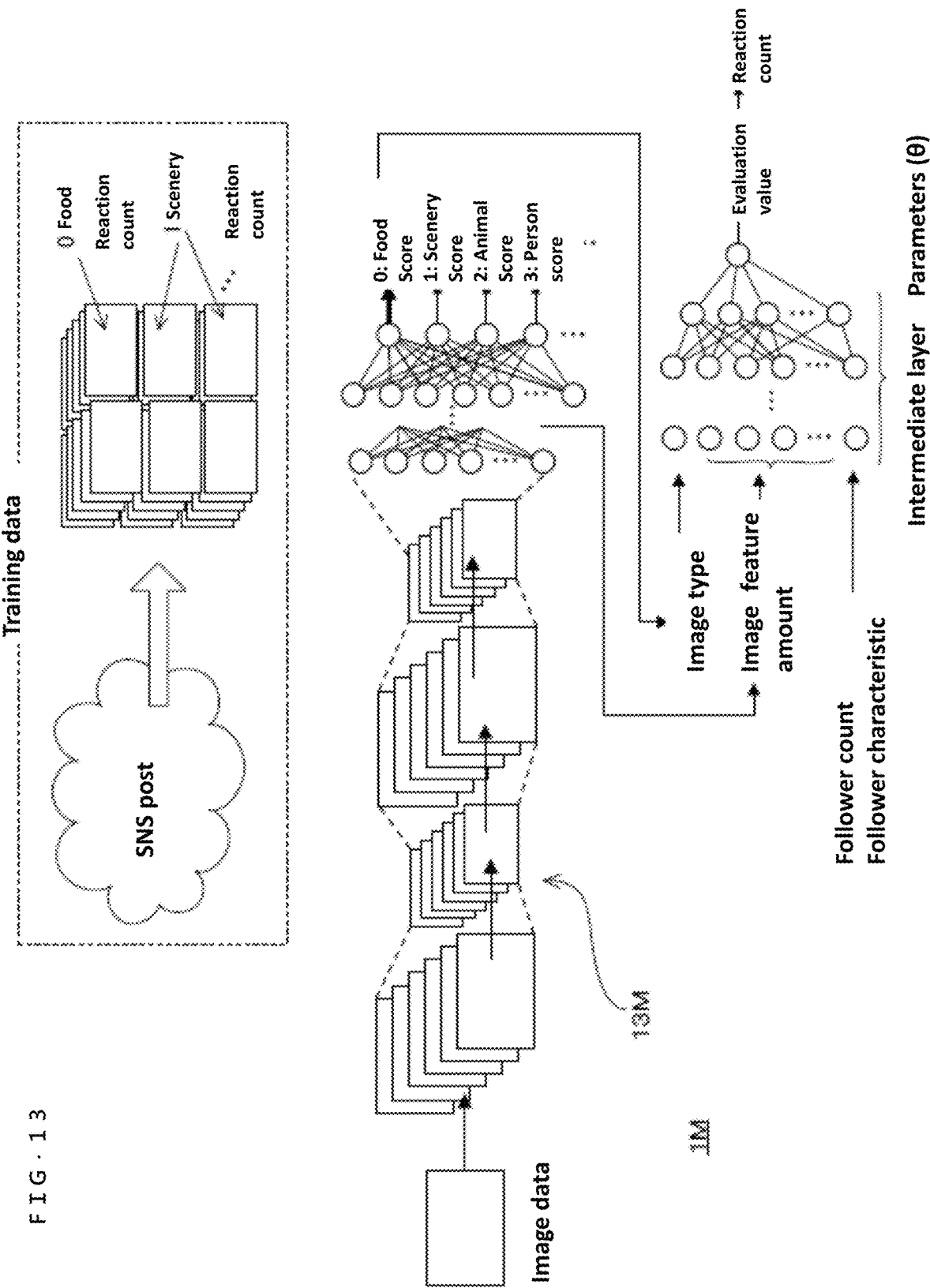
FIG. 13 is diagram showing a more detailed example of the evaluation model according to additional embodiments.

FIG. 13 is a diagram showing an example of the evaluation model 1M in more detail. The evaluation model 1M includes an identification model 13M that corresponds to one portion of the functionality of the type acquisition unit 411. The identification model 13M includes an input layer and an intermediate layer. Image data is input to the input layer. The intermediate layer includes multiple convolution layers having a predetermined number of nodes for the image data. The intermediate layer of the identification model 13M may include a pooling layer, a fully connected layer, or the like. The intermediate layer of the identification model 13M includes a network in which features output from the convolution layers are associated with nodes. The identification model 13M has an output layer that includes a channel for each type of image that has been set. The output layer outputs the likelihood of each image type as a score (e.g., a probability, a confidence score, or a likelihood score). The type acquisition unit 411 can acquire the type of the object in the input image data based on the image type that has the highest score.

For example, the identification model 13M is trained using training image data in which image data of images posted to an SNS is assigned labels indicating types of objects that have been identified in advance. The identification model 13M learns parameters, weights, and the like in the intermediate layer that reduce the difference between the value output from the identification model 13M for input image data and the actual reaction count for the image. When the magnitude of the difference and the training count satisfy predetermined conditions and training is complete, identification model 13M parameters included in the model parameters θ are obtained. The obtained identification model 13M parameters are stored in the first storage unit 42. Note that an existing high-reliability identification model may be used as the identification model 13M.

Image type identification results output from the trained identification model 13M and input image data are input to the evaluation model 1M. The evaluation model 1M may be designed such that image feature amounts obtained from the intermediate layer of the identification model 13M are input as image data.

The intermediate layer of the evaluation model 1M is defined as a neural network that includes a predetermined number of layers and nodes. In the information processing apparatus 4, processing is executed such that the evaluation model 1M learns parameters, weights, and the like in the intermediate layer such that when image data of images posted to an SNS or image feature amounts are input as training data, the output evaluation values coincide with evaluation values that correspond to reaction counts in the training data. In other words, in the information processing apparatus 4, processing is executed such that the evaluation model 1M learns parameters, weights, and the like in the intermediate layer that minimize the difference between output evaluation values and evaluation values that correspond to reaction counts in the training data when image data of images posted to an SNS or image feature amounts are input as training data.

Note that the reaction count in the training data is preferably based as the reaction count of the piece of image data that has the highest reaction count, or a ratio of the reaction count for each piece of posted image data relative to the average value, for each SNS account (e.g. a user account on the SNS or social media platform). The ratio is a percentage, for example.

As shown in FIG. 13, the evaluation model 1M may further receive the follower count of the user or a follower characteristic as input. Examples of follower characteristics include whether the follower tends to react to "food", "scenery", or "animal" image types. By using the evaluation model 1M that outputs evaluation values that take follower characteristics of the user into account, the evaluation value calculation unit 415 can calculate an evaluation value as a reaction prediction value.

The evaluation model 1M is not limited to the example shown in FIG. 13. The evaluation model 1M may be trained to, upon receiving an input of image data, output an evaluation value that corresponds to the number of reactions that would be received if that image data is posted. The evaluation model 1M may be trained to output an identification result along with the evaluation value. The evaluation model 1M may be a model that is trained using another algorithm. The evaluation model 1M is not limited to deep learning that employs a neural network as described above, and may derive an evaluation value using one or more specified mathematical expressions.

In the example provided by in FIGS. 12 and 13, the evaluation model 1M incorporates the identification model 13M that identifies an image type and outputs an evaluation value. However, there is no limitation to this, and instead of incorporating the identification model 13M, the evaluation model 1M may be divided into models that are trained to output an evaluation value for input image data for each image type.

With use of the evaluation model 1M, the evaluation value calculation unit 415 can receive an input of image data and acquire, from the evaluation model 1M, an evaluation value for the case where the user posts that image data to the SNS.

Figure 14:
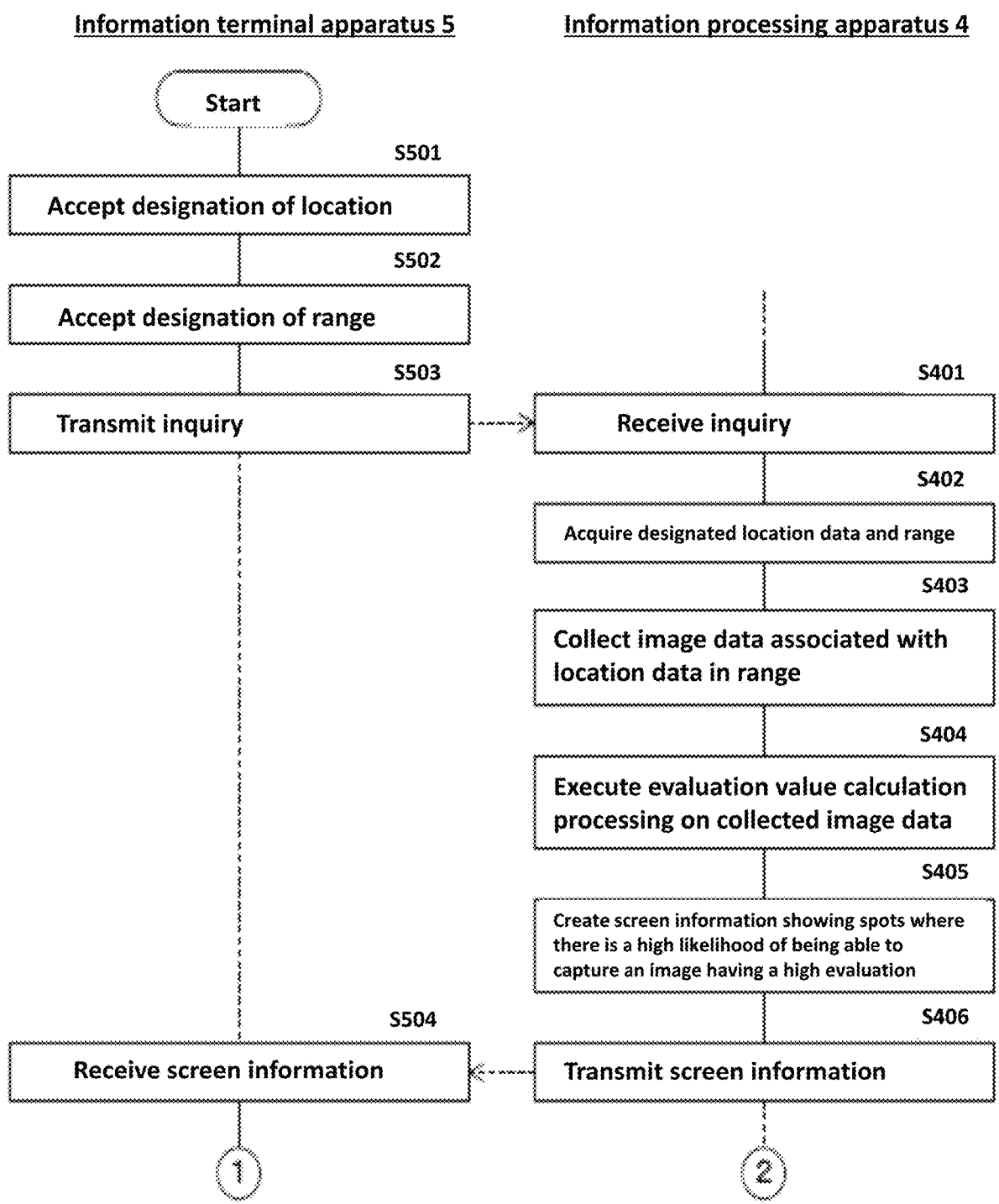
FIG. 14 is a flowchart showing an example of a processing procedure executed by the information processing apparatus and the information terminal apparatus according to additional embodiments.
Figure 15:
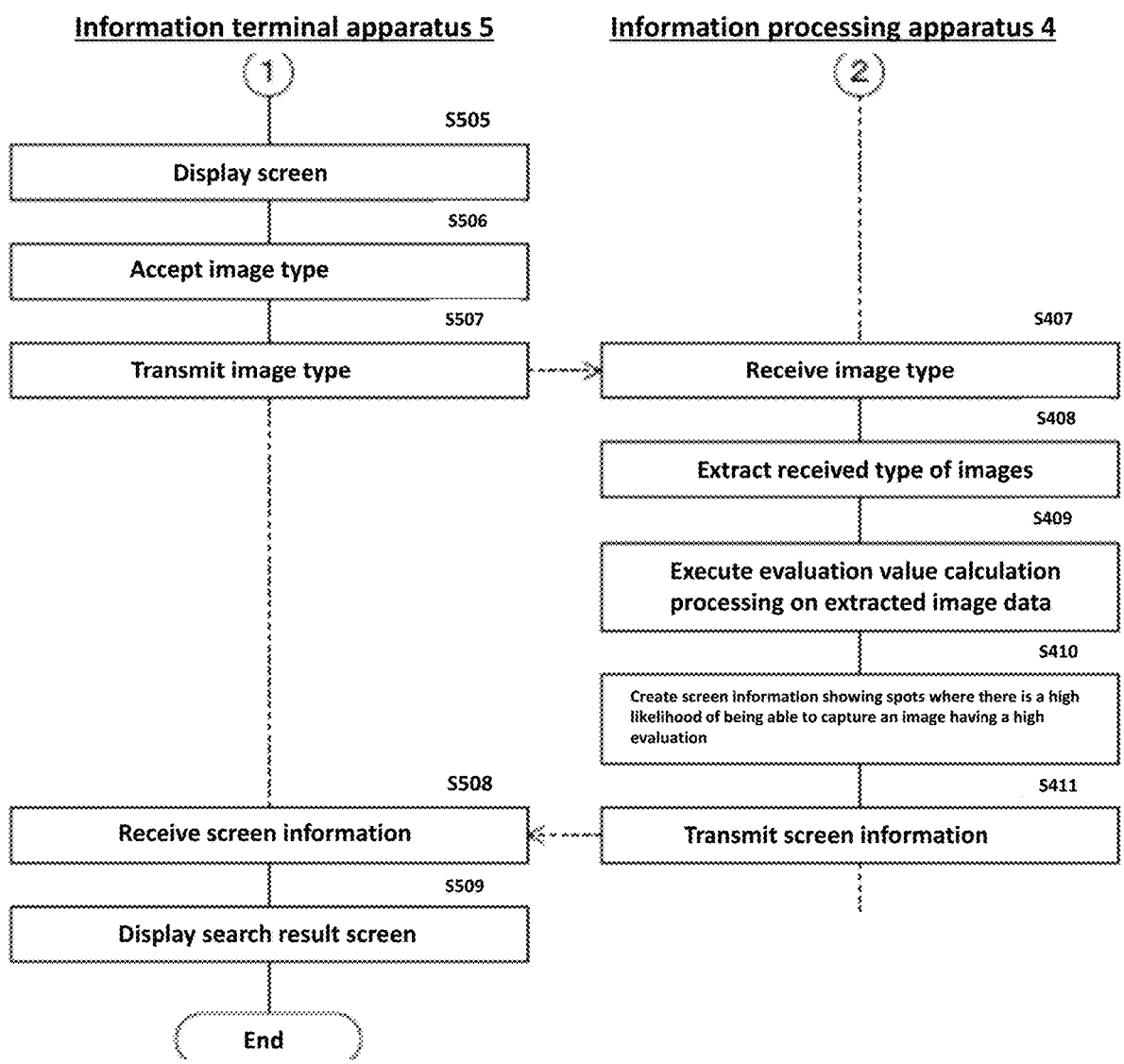
FIG. 15 is a flowchart showing an example of a processing procedure executed by the information processing apparatus and the information terminal apparatus according to additional embodiments.

FIGS. 14 and 15 are flowcharts showing an example of a processing procedure executed by the information processing apparatus 4 and the information terminal apparatus 5. The second control unit 51 of the information terminal apparatus 5 accepts a designation of location data in accordance with a user operation (step S501).

In S501, the second control unit 51 uses the operation unit 54 to accept a selection of "current location" or "destination", and an input of a selected destination. If "current location" is selected, the second control unit 51 accepts a designation of location data as longitude and latitude data that is acquired by the location data acquisition unit 57 at the time when the selection was made. If "destination" was selected, the second control unit 51 searches for destination candidates such as facilities, shops, a street address, or tourist spots in accordance with text that was input via the operation unit 54. The second control unit 51 then accepts a selection of one of the destination candidates that were found through the search. The second control unit 51 acquires location data of the selected destination candidate as longitude and latitude data. The second control unit 51 accepts the acquired location data as designated location data.

The second control unit 51 accepts a designation of a range for searching for spots with respect to the designated location data (S502). The range may be designated as a specified distance set in advance in accordance with the scale of the map, may be designated as a range on the map, or may be designated as the range of the map image displayed on the display unit 53. The second control unit 51 may accept a designation of a distance such as "within xxx m of designated location". In some embodiments, the specified distance is determined based on a user selection or a user-defined setting. In some embodiments, the specified distance is determined based on a default setting.

The second control unit 51 of the information terminal apparatus 5 transmits, to the information processing apparatus 4, a spot inquiry that includes the designated location data and the designated range data (S503).

Upon receiving the spot inquiry (S401), the information processing apparatus 4 acquires the designated location data included in the spot inquiry (S402). The first control unit 41 then collects pieces of image data (S403) that are associated with locations within the designated range from the location indicated by the location data acquired in S402.

In some embodiments, the image data collected in S403 includes image data that is disclosed on the Internet. For example, in S403, the first control unit 41 collects image data posted by restaurants on a restaurant review site, an information site, a search engine site, a restaurant website, a restaurant profile on a social media platform, or an advertising site, as image data associated with restaurant longitude and latitude data. A configuration is possible in which restaurant longitude and latitude data can be acquired from restaurant websites. As another example, in S403, the first control unit 41 may collect image data posted along with reviews on a restaurant review site, as image data associated with restaurant addresses. The restaurant addresses are preferably associated with longitude and latitude data that is to serve as the location data. The first control unit 41 may collect image data on a tourist spot review site or tourist spot information travel site regarding good "scenery" spots, as image data associated with tourist spot addresses. The first control unit 41 may collect image data from a popular "historic landmark" review site as image data associated with "historic landmark" addresses. The first control unit 41 may also collect image data from a good "outings for children" review site as image data associated with the addresses of spots such as parks or facilities. When collecting image data, the first control unit 41 may collect such data for each type of spot that is reviewed by a review site.

The first control unit 41 of the information processing apparatus 4 executes processing for calculating, by the calculation unit 415, an evaluation value for collected image data (S404) (e.g., each piece of collected image data). Based on the evaluation values corresponding to the image data and the location data associated with the image data, the first control unit 41 creates screen information that indicates spots where there is a high likelihood of being able to capture an image that has a high evaluation value (S405). The first control unit 41 causes the first communication unit 43 to transmit the created screen information to the information terminal apparatus 5 (S406).

In S405, the first control unit 41 performs statistical processing to obtain statistics (e.g., the average, mean, mode, or the like) of the evaluation values that were calculated by the evaluation value calculation unit 415 for the image data that was collected in association with location data for one location, and associates the evaluation value resulting from the statistical processing with the location data. The first control unit 41 creates the screen information such that the user can recognize that the evaluation values are associated with spot-related information that corresponds to location data.

In the information terminal apparatus 5, when the screen information is received (S504), the second control unit 51 displays a search result screen on the display unit 53 based on the screen information (S505). If the information processing apparatus 4 has used only evaluation values obtained by evaluating image data on a restaurant site, the information terminal apparatus 5 can display screen information for a list of restaurants as the search result screen on the display unit 53. The information processing apparatus 4 can collect image data for each of various types of evaluation target spots from a restaurant review site, a tourist spot review site, a "historic landmark" review site, and an "outings for children" review site. In the case of collecting image data for each of various types of evaluation target spots, the first control unit 41 can also create screen information that allows the user to recognize the association between the evaluation values and the related information for each type of spot corresponding to location data. In the information terminal apparatus 5, list screen information for each type of image such as restaurant, tourist spot, "historic landmark", and "outings for children" can also be displayed as the search result screen on the display unit 53.

The second control unit 51 may accept a designation of an image type with respect to the list screen being displayed (S506). The second control unit 51 transmits the designated image type to the information processing apparatus 4 (S507).

In the information processing apparatus 4, when the image type designation is received (S407), the first control unit 41 extracts images that have the designated image type from the image data that was collected in S403 (S408). The information processing apparatus 4 executes processing for re-calculating evaluation values for the extracted image data (S409).

The first control unit 41 re-creates screen information based on the re-calculated evaluation values and the location data associated with the image data (S410). The first control unit 41 transmits the re-created screen information to the information terminal apparatus 5 (S411).

In the information terminal apparatus 5, when the screen information is received (S508), the second control unit 51 displays a search result screen on the display unit 53 based on the screen information (S509), and then this processing is ended.

Note that a configuration is possible in which the processing of S408 to S411 is executed before S404, and screen information is separately created and transmitted for each type (see FIGS. 17A and 17B).

Figure 16:
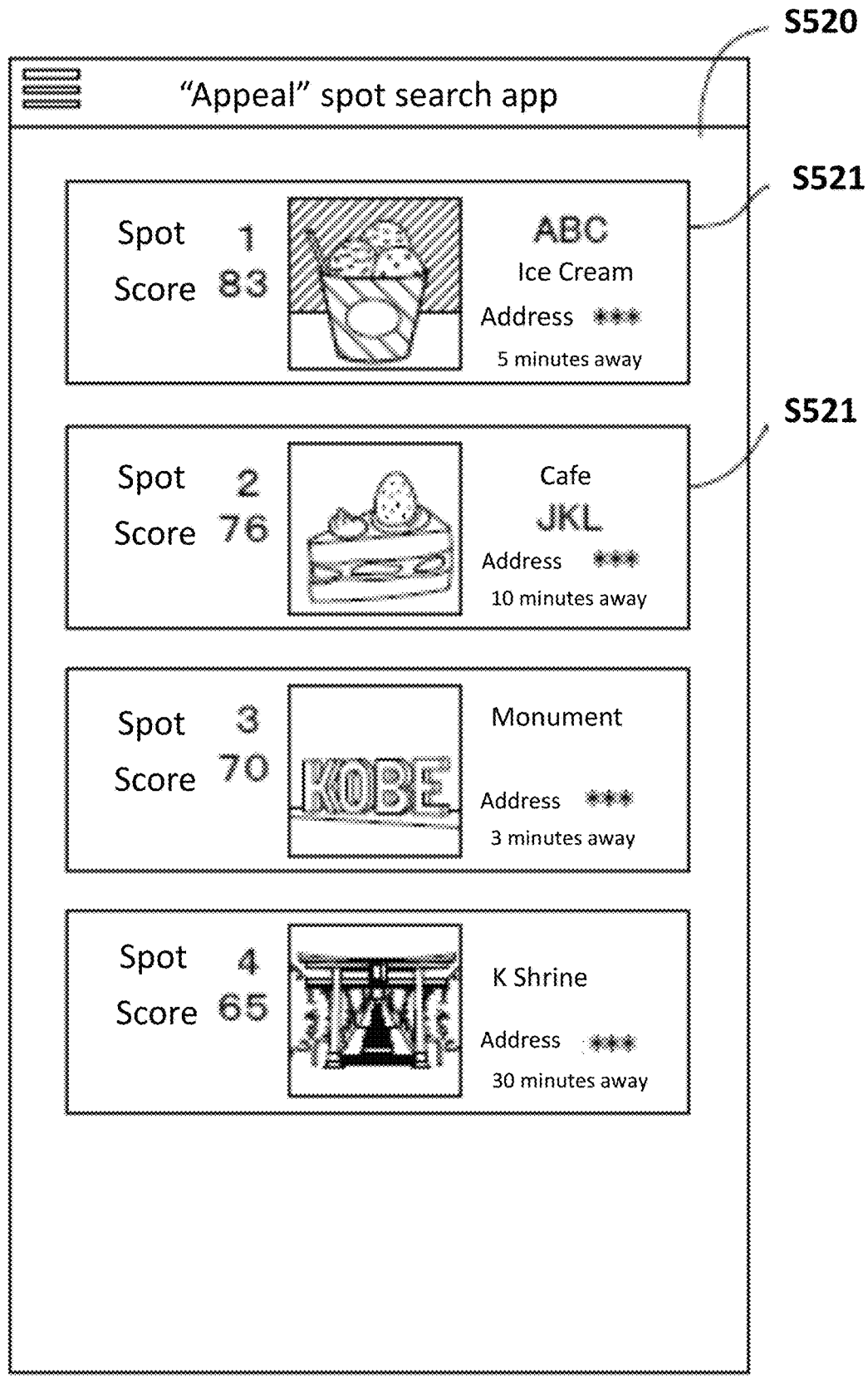
FIG. 16 shows an example of a screen displayed by the information terminal apparatus according to additional embodiments.

The following is a description based on examples of screens displayed by the information terminal apparatus 5. FIG. 16 shows an example of a screen displayed by the information terminal apparatus 5. An application screen 520 (e.g., a user interface or a graphical user interface for an application that is displayed on a screen, also referred to herein as "app screen" 520) that is based on screen information is displayed on the display unit 53. The app screen 520 includes a list of display screens 521 in order of highest evaluation value, and each display screen 521 includes the name of, the address of, and the distance to a spot (e.g., relative to a current location or a destination location) where there is a high likelihood of being above to capture an image having a high evaluation value, and also related data such as an image that was captured at the spot. The display screens 521 corresponding to the spots can each be selected with use of the operation unit 54. In some embodiments, when a display screen 521 (e.g., a spot) is selected, additional detailed information regarding the selected spot is displayed in the app screen 520.

Figure 17:
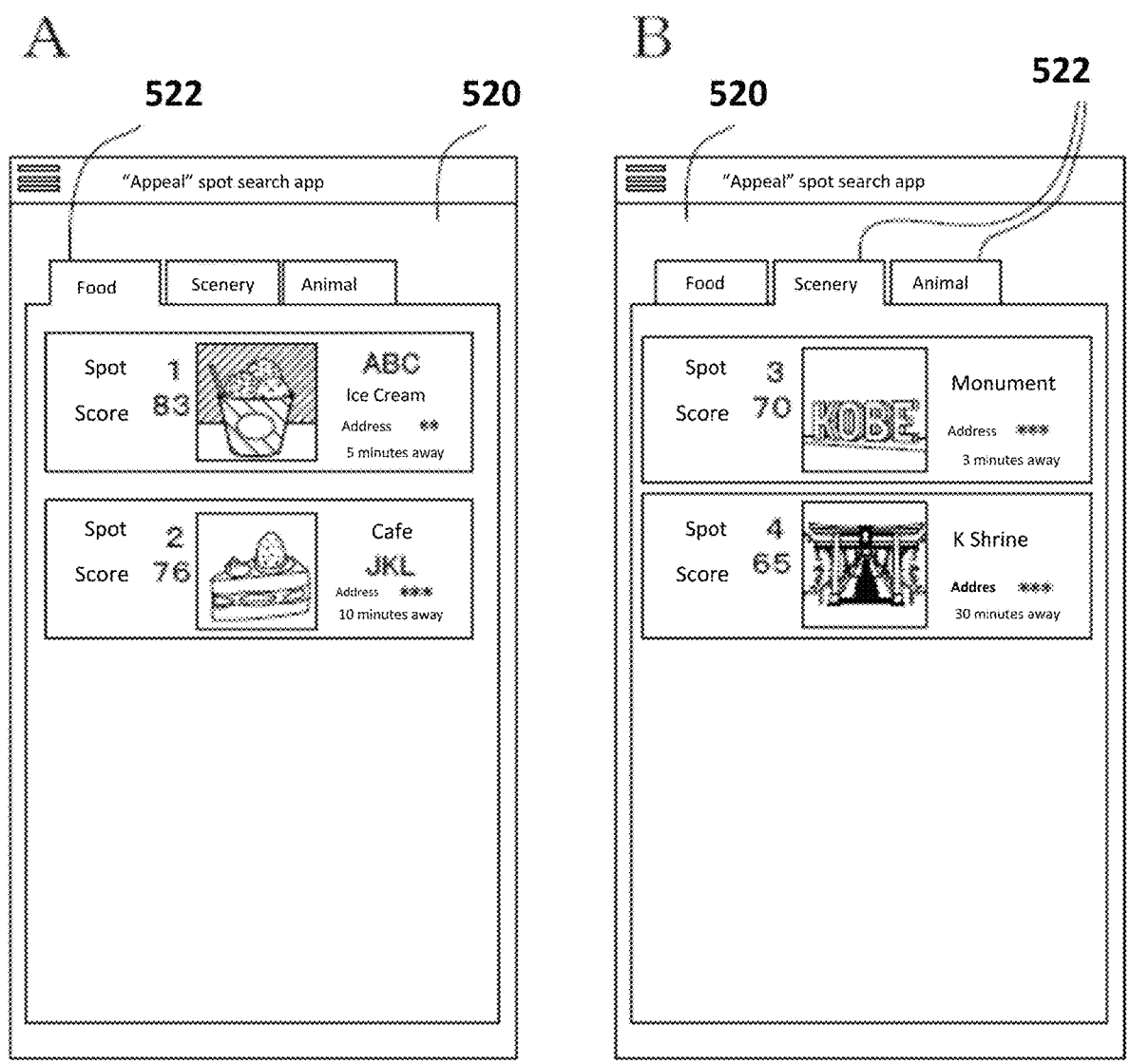
FIG. 17 shows another example of a screen displayed by the information terminal apparatus according to additional embodiments.

FIG. 17 shows another example of a screen displayed by the information terminal apparatus 5. In the example in FIG. 17, screen information has been created for each type of image in advance. In the example in FIG. 17, the images are divided into the three image types "food", "scenery", and "animal". In the example in FIG. 17, in S404 in the processing procedure shown in FIGS. 14 and 15, the first control unit 41 of the information processing apparatus 4 inputs the collected image data to the identification model 13M and acquires corresponding image types with use of the type acquisition unit 411. The first control unit 41 separates the evaluation values for the image data calculated in S404 according to image type, and, for each type, creates a list of spots where there is a high likelihood of being able to capture an image having a high evaluation value.

In FIG. 17, item A, the app screen 520 includes a list displayed in the case where a "food" tab 522 was selected on the information terminal apparatus 5, and in FIG. 17, item B, the app screen 520 includes a list displayed in the case where a "scenery" tab 522 was selected on the information terminal apparatus 5 from among multiple tabs 522. By selecting the various tabs 522, the user can see presented spots for each type of image.

Figure 18:
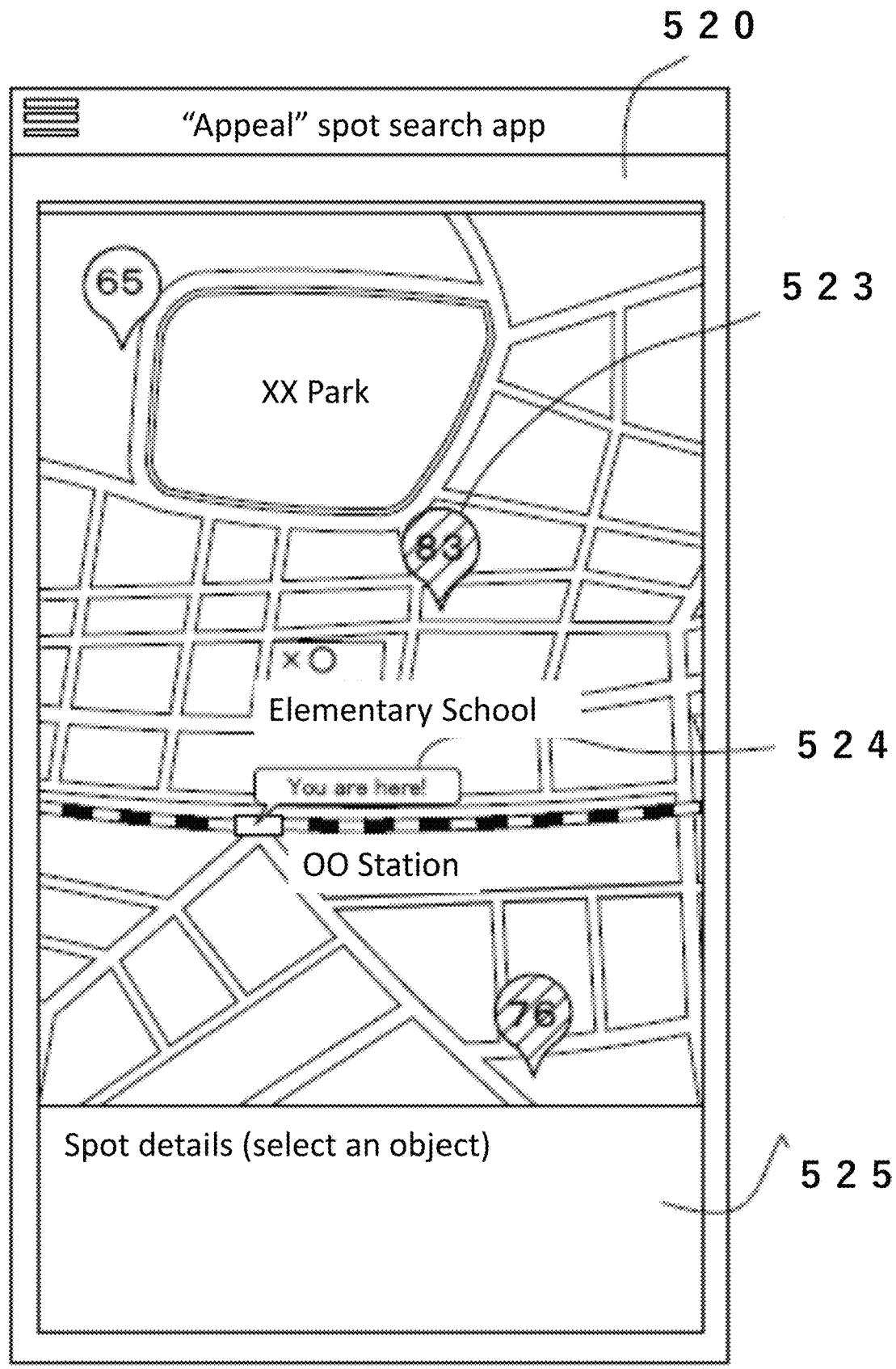
FIG. 18 shows another example of a screen displayed by the information terminal apparatus according to additional embodiments.

FIG. 18 shows another example of a screen displayed by the information terminal apparatus 5. In the app screen 520 in FIG. 18, objects 523 that include evaluation value text are arranged at the positions of corresponding spots on a map image (e.g., a map or a geographic map). The objects 523 may be displayed at sizes that correspond to the magnitude of the evaluation value. The information terminal apparatus 5 can display the objects 523 larger and more prominently when the indicated position is associated with image data that has a higher evaluation value. In the example in FIG. 18, the app screen 520 includes a marker 524 that indicates the current location, and a detail screen 525 at the bottom for displaying spot related data.

Figure 19:
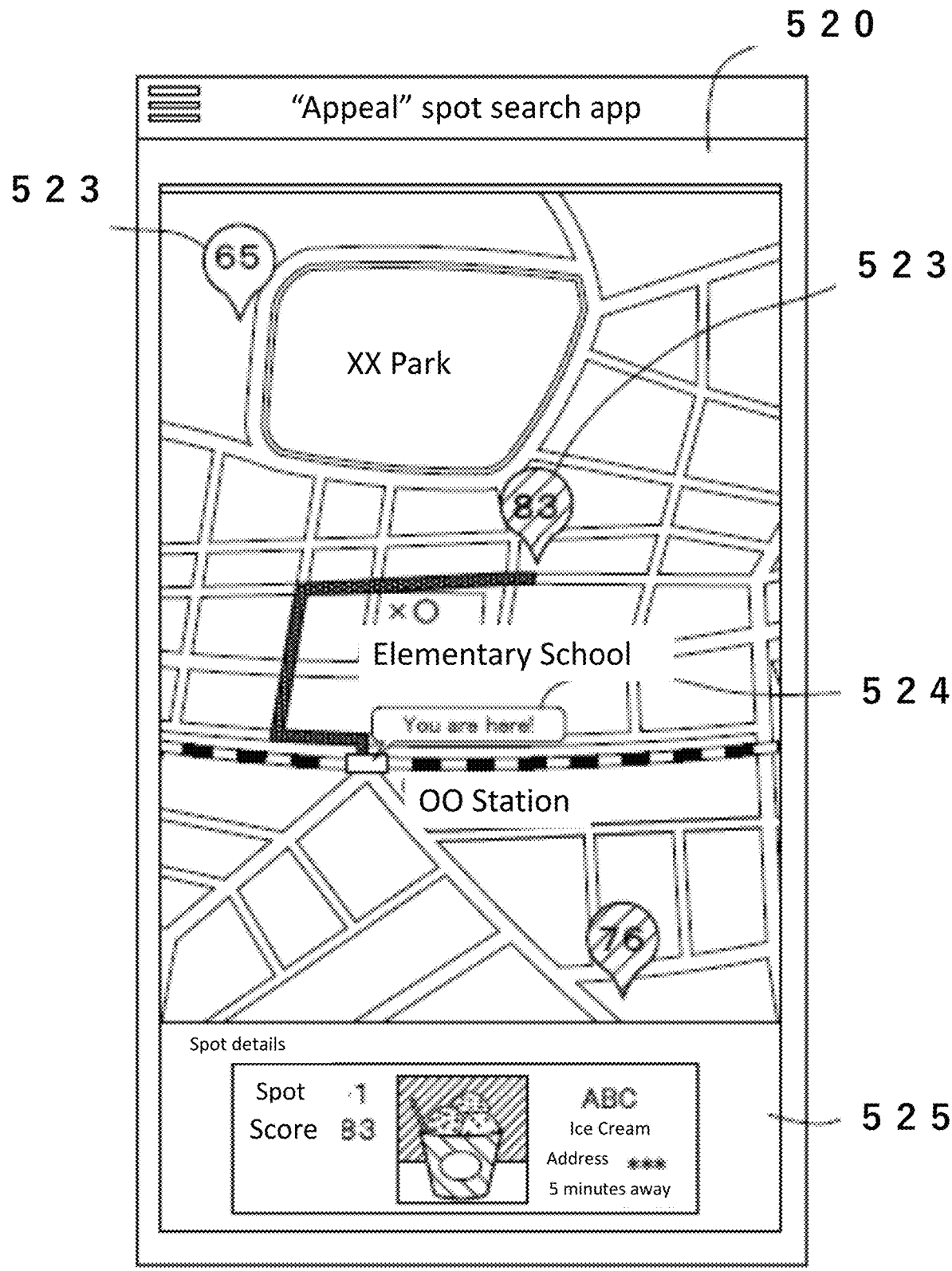
FIG. 19 shows another example of a screen displayed by the information terminal apparatus according to additional embodiments.

FIG. 19 shows another example of a screen displayed by the information terminal apparatus 5. FIG. 19 shows an example in which the object 523 corresponding to the spot with the evaluation value "83" in the screen example shown in FIG. 18 was selected using the operation unit 54. In the app screen 520 in FIG. 19, a route to the selected spot is displayed on a map. When (e.g., in response to, or in accordance with) the first control unit 41 receives a notification that the object 523 was selected from the information terminal apparatus 5, the route search unit 416 searches for a route from the current location of the information terminal apparatus 5 to the location that corresponds to the selected object 523, and the route is rendered on a map image, and resulting map image is transmitted to the information terminal apparatus 5. In the app screen 520 in FIG. 19, the route is displayed along with a detail screen 525 that displays related data regarding the spot corresponding to the selected object 523, such as the name and address of the spot and the distance thereto, as well as an image that was captured at the spot, for example.

In this way, the user can find out a spot where it is possible to take an "appealing" photographic image that has a high likelihood of receiving many reactions from other users on an SNS.

In some embodiments, the information processing apparatus 4 realizes spot search processing, that is to say the functionality of the type acquisition unit 411, the count acquisition unit 412, the prediction unit 413, the count estimation unit 414, the evaluation value calculation unit 415, and the route search unit 416. However, the information terminal apparatus 5 can store definition data for the evaluation model 1M, calculate evaluation values, and realize the functionality of the information processing system 20 on its own.

In other words, the information processing system 20 may include the image acquisition unit 418, the evaluation value calculation unit 415, and the output unit 417. The image acquisition unit 418 acquires image data. Location data may be associated with the image data. The evaluation value calculation unit 415 may calculate evaluation values. The evaluation values indicate the likelihood of receiving SNS reactions for the image data acquired by the image acquisition unit 418. The output unit 417 outputs screen information. The screen information indicates spots. The spots indicate that there is a high likelihood of being able to capture an image having a high evaluation value, based on the evaluation values calculated for the image data and the location data corresponding to the image data.

According to the exemplary information processing system 20, the user can find out a spot where it is possible to take an "appealing" photographic image that has a high likelihood of receiving many reactions from other users on the SNS.

Also, the exemplary information processing system 20 includes the information processing apparatus 4 and the information terminal apparatus 5. The information processing apparatus 4 includes the output unit 417. The information terminal apparatus 5 is configured to exchange data with the information processing apparatus 4. The information terminal apparatus 5 includes the location data acquisition unit 57 and the second communication unit 56. The location data acquisition unit 57 acquires the aforementioned location data. The second communication unit 56 transmits the location data acquired by the location data acquisition unit 57 to the information processing apparatus 4. The output unit 417 of the information processing apparatus 4 is the first communication unit 43. The first communication unit 43 transmits the above-described screen information to the information terminal apparatus 5. The screen information indicates spots that are in a specified range from the location indicated by the location data that was received from the information terminal apparatus 5.

Furthermore, in the exemplary information processing system 20, the location data acquisition unit 57 acquires location data. The location data indicates the location of the information terminal apparatus 5. The first communication unit 43 transmits the above-described screen information to the information terminal apparatus 5. The screen information indicates the spots that are in the specified range. The location of the information terminal apparatus 5 is included in the specified range.

Also, in the exemplary information processing system 20, the information terminal apparatus 5 accepts a destination and causes the second communication unit 56 to transmit location data indicating the destination to the information processing apparatus 4. The first communication unit 43 transmits the above-described screen information to the information terminal apparatus 5. The screen information indicates the spots that are in the specified range. The specified range includes the destination accepted by the information terminal apparatus 5.

The exemplary information processing system 20 further includes the type acquisition unit 411. The type acquisition unit 411 acquires image types of images in the image data acquired by the image acquisition unit 418. The output unit 417 outputs the above-described screen information for each image type. The screen information is based on location data that is associated with image data whose evaluation value calculated by the evaluation value calculation unit 415 is higher than other image data.

In the exemplary information processing system 20, the evaluation value calculation unit 415 outputs evaluation values based on an evaluation model. The evaluation model has been trained so as to, upon receiving photographic image or moving image data, output an evaluation value for the photographic image or moving image.

In the exemplary information processing system 20, the screen information includes information for displaying a screen that includes a list of related data including descriptions of spots in order of highest evaluation value.

In the exemplary information processing system 20, the screen information includes information displaying objects that include text indications of evaluation values at positions corresponding to the spots of a map image.

The exemplary information processing apparatus 4 includes the image acquisition unit 418, the evaluation value calculation unit 415, and the output unit 417. The image acquisition unit 418 acquires image data that is associated with location data. The evaluation value calculation unit 415 calculates evaluation values. The evaluation values indicate the likelihood of receiving SNS reactions for the image data acquired by the image acquisition unit 418. The output unit 417 outputs screen information that shows spots where there is a high likelihood of being able to capture an image having a high evaluation value, based on the evaluation values calculated for the image data and the location data corresponding to the image data.

Also, a computer program recorded on a recording medium may cause a computer to execute processing that includes accepting a designation of location data that indicates a location (e.g., GPS coordinates or a street address), transmitting the designated location data or a specified range that includes the location indicated by the location data to the information processing apparatus 4 by communication, receiving screen information that indicates spots where there is a high likelihood of being able to capture an image having a high evaluation value from the information processing apparatus 4, and displaying a screen that includes a list of related data including spot descriptions in order of highest evaluation value based on the screen information.

Furthermore, a computer program may cause a computer to execute processing that includes accepting a designation of location data that indicates a location, transmitting the designated location data or a specified range that includes the location indicated by the location data to the information processing apparatus 4 by communication, receiving screen information that indicates spots where there is a high likelihood of being able to capture an image having a high evaluation value from the information processing apparatus 4, and displaying a screen in which objects that indicate the evaluation values are arranged at positions corresponding to the spots on a map image based on the screen information.

Also, an information processing method may include the exemplary information processing apparatus 4 and the exemplary information terminal apparatus 5 that exchanges data with the information processing apparatus 4. The information processing method is executed by the information processing apparatus 4 and the information terminal apparatus 5 in the information processing system 20. The information processing apparatus 4 acquires image data that is associated with location data, calculates an evaluation value that indicates the likelihood of obtaining SNS reactions for each piece of acquired image data, and transmits, to the information terminal apparatus 5, screen information that indicates spots where there is a high likelihood of being able to capture an image having a high evaluation value based on the evaluation values calculated for the image data and the location data corresponding to the image data. The method further includes processing in which the information terminal apparatus 5 displays a screen showing the spots based on the screen information.

Furthermore, a non-transitory recording medium has recorded thereon a program to be executed by a computer. The exemplary program acquires the image type of images included in image data. The program may cause the computer to execute processing that includes calculating the above-described evaluation values based on an evaluation model that has been trained to, upon receiving an input of the image data, output evaluation values that indicate the likelihood of obtaining reactions to the image data on an SNS for each image type.

In general, on an SNS application, spots such as restaurants and tourist sites where so-called "appealing" photographic images that can obtain many reactions are popular. According to the exemplary information processing system 20 of some embodiments of the present disclosure, the user can reference images posted by other users to plan a trip to or a meal at the same spot as other users in order to take an "appealing" photographic image, for example.

Also, in another aspect, if there is travel information for a spot where an "appealing" photographic image can be taken, or if other users have provided an address or location data for such a spot, the user can clearly find out where the spot is. In some cases, the location of the spot or the way (e.g., route) to the spot cannot be easily found out by the user based on the "appealing" photographic image, and therefore the user cannot take a similar photographic image, but even in such a case, the information processing system 20 of the second embodiment can provide assistance for finding spots where an "appealing" photographic image can be taken. In some cases the information processing system 20 of the second embodiment can meet the demand to be able to discover an unknown spot for which other users have not posted yet.

The processes or functions of the above embodiments may be realized by centralized processing performed by a single apparatus or a single system, or may be realized by decentralized processing performed by multiple apparatuses or multiple systems. The constituent elements of the embodiments may be configured by dedicated-purpose hardware. Also, constituent elements in the embodiments that can be realized by software may be realized by execution of a program.

The constituent elements of the above embodiments may be realized by a CPU executing a software program recorded on a recording medium, for example. The program may be executed by being downloaded from a server, or may be executed by being read out from a predetermined recording medium on which it is recorded. The program may be executed by one computer or multiple computers. In other words, the information processing system 10 of the above embodiment may be configured such that centralized processing is performed, or may be configured such that decentralized processing is performed. The constituent elements of the above embodiments may be applied mutually.

The present invention can be carried out in various aspects without departing from the spirit, gist, or main features thereof. The above embodiments are merely examples in all respects, and the interpretation of the present invention is not intended to be limited thereto. In other words, the present invention is an information retrieval apparatus or an information processing system, which has been described by way of example of the above embodiments.

In some embodiments, the present disclosure provides a non-transitory recording medium having recorded thereon a program for causing a computer to execute processing comprising: acquiring an image type of an image included in image data; and calculating an evaluation value based on an evaluation model that has been trained so as to, upon receiving an input of the image data, output an evaluation value that indicates a likelihood of obtaining reactions to the image data on an SNS (Social Network Service) for each image type.

In some embodiments, the present disclosure provides an information processing system comprising: a type acquisition unit configured to acquire an image type of an image included in image data; a count acquisition unit configured to acquire count data that includes a reaction count of a piece of content that obtained a highest number of reactions from other users in a case where a user posted a plurality of pieces of content to a social media platform, and a specific reaction count of reactions from other users for each predetermined image type of an image posted to the social media platform; and a prediction unit configured to predict an evaluation of the image based on the image type of the image and the count data.

In additional embodiments, the information processing system may further comprise a count estimation unit configured to estimate, in accordance with a follower count, a potential count that indicates a likelihood of receiving reactions from other users if a piece of content is posted to the social media platform by a predetermined user, wherein the prediction unit acquires a predicted count of reactions for the image based on the evaluation of the image, the potential count, and the follower count of the predetermined user.

In further embodiments, the information processing system may comprise:

a terminal apparatus and a server apparatus, wherein the terminal apparatus includes:

an image capturing apparatus configured to acquire the image data that includes the image that was captured;

an input apparatus configured to receive an input of the follower count of the predetermined user;

a communication apparatus configured to transmit the image data and the follower count of the predetermined user, and receive the predicted count; and a display apparatus configured to display the predicted count, and the server apparatus includes the type acquisition unit, the count acquisition unit, the prediction unit, and the count estimation unit, and further includes:

a server communication unit configured to receive the image data and the follower count of the predetermined user, and transmit the predicted count; and a server storage unit configured to store a program that causes the prediction unit to function through machine learning.

In yet further embodiments, the image data includes a still image or a moving image. The type acquisition unit may acquire an attribute of an object appearing in the image, and the number of objects appearing in the image. The attributes may include human gender, animal type, scenery, and food.

In some embodiments, the present disclosure provides an information processing method comprising:

a type acquiring step of acquiring an image type of an image included in image data;

a count acquiring step of acquiring count data that includes a reaction count of a piece of content that obtained a highest number of reactions from other users in a case where a user posted a plurality of pieces of content to a social media platform, and a specific reaction count of reactions from other users for each predetermined image type of an image posted to the social media platform;

a count estimating step of estimating, in accordance with a follower count, a potential count that indicates a likelihood of receiving reactions from other users if a piece of content is posted to the social media platform by a predetermined user; and a predicting step of acquiring a predicted count of reactions for the image from the follower count of the predetermined user, based on the image type of the image, the count data, and the potential count.

In some embodiments, the present disclosure also provides the following method, computer system and non-transitory computer readable storage medium.

In one aspect, the present disclosure provides the following.

[1] A method performed at a server system having one or more processors and memory storing one or more programs configured for execution by the one or more processors, the method comprising:

receiving an image and image information corresponding to the image;

retrieving a model that has been trained according to (i) a plurality of images posted to a social media platform and (ii) image information corresponding to the plurality of images, wherein:

image information for a respective image of the plurality of images includes:

a respective reaction count for the respective image, the respective reaction count being a number of reactions from users of the social media platform to the respective image; and a respective evaluation value for the respective image that is determined based on a highest reaction count and the respective reaction count; and the highest reaction count is a number of reactions from users of the social media platform to a first image in the social media platform that has received a highest number of reactions from users;

forming a set of parameters comprising the received image and image information;

applying the trained model to the set of parameters to generate an evaluation value for the image and a predicted reaction count for the image.

[2] The method of [1], wherein image information for the respective image of the plurality of images includes an image type, the method further comprising:

applying the trained model to the set of parameters to generate an image type for the received image.

[3] The method of [1], further comprising:

providing at least one of the evaluation value and the predicted reaction count for the received image.

[4] The method of [1], wherein the respective evaluation value for the respective image of the plurality of images is determined based on a comparison between the respective reaction count for the respective image and the highest reaction count.

[5] The method of [1], wherein the respective evaluation value for the respective image of the plurality of images is calculated by dividing the respective reaction count for the respective image by the highest reaction count.

[6] The method of [1], wherein the image information for the respective image of the plurality of images includes a respective user identifier corresponding to a respective user of the social media platform the plurality of images.

[7] The method of [6], wherein the user of the social media platform has a respective number of followers that is greater than a threshold value.

[8] The method of [1], wherein the respective image is a moving image or a still image.

[9] The method of [1], wherein:
the image information for the respective image includes:
a respective number of objects that appear in the respective image; and
one or more respective attributes of one or more objects that appear in the respective image;
applying the trained model includes:
identifying at least one object in the received image; and
determining an attribute of the object in the received image; and
the evaluation value for the received image and the predicted reaction count for the received image are determined based at least in part on the attribute of the object in the received image.

[10] The method of [9], wherein an attribute is selected from the group consisting of:
human gender;
animal type;
scenery; and
food.

[11] A computer system comprising:
one or more processors;
memory; and
one or more programs stored in the memory and configured for execution by the one or more processors, the one or more programs comprising instructions for:
receiving an image and image information corresponding to the image;
retrieving a model that has been trained according to a plurality of images posted to a social media platform and image information corresponding to the plurality of images, wherein:
image information for a respective image of the plurality of images includes:
a respective reaction count for the respective image, the respective reaction count being a number of reactions from users of the social media platform to the respective image; and
a respective evaluation value for the respective image that is determined based on a highest reaction count and the respective reaction count; and
the highest reaction count is a number of reactions from users of the social media platform to a first image in the social media platform that has received a highest number of reactions from users;
forming a set of parameters comprising the received image and image information;
applying the trained model to the set of parameters to generate an evaluation value for the image and a predicted reaction count for the image.

[12] The computer system of [11], wherein image information for the respective image of the plurality of images includes an image type, the method further comprising:
applying the trained model to the set of parameters to generate an image type for the received image.

[13] The computer system of [11], further comprising:
providing at least one of the evaluation value and the predicted reaction count for the received image.

[14] The computer system of [11], wherein:
the image information for the respective image includes:
a respective number of objects that appear in the respective image; and
one or more respective attributes of one or more objects that appear in the respective image;
applying the trained model includes:
identifying at least one object in the received image; and
determining an attribute of the object in the received image; and
the evaluation value for the received image and the predicted reaction count for the received image are determined based at least in part on the attribute of the object in the received image.

[15] The computer system of [11], wherein an attribute is selected from the group consisting of:
human gender;
animal type;
scenery; and
food.

[16] A non-transitory computer readable storage medium storing one or more programs configured for execution by a computer system having one or more processors, memory, and a display, the one or more programs comprising instructions for:
receiving an image and image information corresponding to the image;
retrieving a model that has been trained according to a plurality of images posted to a social media platform and image information corresponding to the plurality of images, wherein:
image information for a respective image of the plurality of images includes:
a respective reaction count for the respective image, the respective reaction count being a number of reactions from users of the social media platform to the respective image; and
a respective evaluation value for the respective image that is determined based on a highest reaction count and the respective reaction count; and
the highest reaction count is a number of reactions from users of the social media platform to a first image in the social media platform that has received a highest number of reactions from users;
forming a set of parameters comprising the received image and image information;
applying the trained model to the set of parameters to generate an evaluation value for the image and a predicted reaction count for the image.

[17] The non-transitory computer readable storage medium of [16], further comprising:
displaying at least one of the evaluation value and the predicted reaction count for the received image.

[18] The non-transitory computer readable storage medium of [16], wherein image information for the respective image of the plurality of images includes an image type, the method further comprising:
applying the trained model to the set of parameters to generate an image type for the received image.

[19] The non-transitory computer readable storage medium of [16], wherein:
the image information for the respective image includes:
a respective number of objects that appear in the respective image; and
one or more respective attributes of one or more objects that appear in the respective image;
applying the trained model includes:
identifying at least one object in the received image; and
determining an attribute of the object in the received image; and the evaluation value for the received image and the predicted reaction count for the received image are determined based at least in part on the attribute of the object in the received image.

[20] The non-transitory computer readable storage medium of [16], wherein an attribute is selected from the group consisting of:
human gender;
animal type;
scenery; and
food.

What is claimed is:

1. A method for building an evaluation model for images, performed at a server system having one or more processors and memory storing one or more programs configured for execution by the one or more processors, the method comprising:
for each image of a plurality of images that is posted to a social media platform by a respective user:
retrieving the respective image;
retrieving respective image information for the respective image;
retrieving a respective reaction count for the respective image, the respective reaction count being a number of reactions from users of the social media platform to the respective image;
calculating a respective evaluation value for the respective image, wherein:
the respective evaluation value for the respective image is determined based on a comparison between the respective reaction count for the respective image and a respective highest reaction count, wherein the respective highest reaction count is computed based on a number of followers, of the respective user, on the social media platform; and
forming a respective set of parameters that include the respective image, the respective evaluation value, and an image type corresponding to the respective image, the image type selected from a predefined plurality of image types;
training a neural network using a plurality of sets of parameters corresponding to the plurality of images, as training data, to correlate the images to output evaluation values, the training including:
extracting features from a convolutional layer of the neural network; and
using the extracted features as inputs to an output layer that generates the output evaluation values;
computing differences between the output evaluation values and the evaluation values in the training data; and
using backward propagation to successively optimize model parameters corresponding to one or more layers of the neural network based on the computed differences, thereby updating the model parameters of the neural network;
storing the trained neural network, including the updated model parameters, in a database of the server system for subsequent use in generating predicted evaluation values for new images, wherein the trained neural network is configured to:
in accordance with receiving, by the server system from a terminal apparatus, a second image and an instruction to evaluate the second image:
apply the trained neural network to generate a first evaluation value corresponding to the second image; and
transmit, by the server system to the terminal apparatus, the first evaluation value.

2. The method of claim 1, wherein:
the trained neural network is further trained to generate a predicted image type for each image of the new images.

3. The method of claim 1, wherein, for each image of the plurality of images:
the respective evaluation value for the respective image is calculated by dividing the respective reaction count for the respective image by the highest respective reaction count.

4. The method of claim 1, wherein the plurality of images are posted to the social media platform during a first predetermined period of time.

5. The method of claim 1, wherein the plurality of images are displayed on the social media platform for at least a second predetermined period of time.

6. The method of claim 1, wherein each image of the plurality of images includes a respective user identifier corresponding to a respective user of the social media platform that posted the respective image.

7. The method of claim 6, wherein the plurality of images has been posted to the social media platform by users of the social media platform having respective numbers of followers that are greater than a threshold value.

8. The method of claim 6, wherein the respective highest reaction count for each user is further computed based on a respective first image, posted by the respective user in the social media platform, that has received a highest number of reactions from users compared to other images posted by the respective user in the social media platform.

9. The method of claim 8, wherein the respective first image for each user is an image posted by the respective user in the social media platform that has received a highest number of reactions from users compared to other images posted by the respective user in the social media platform within a third predetermined period of time.

10. The method of claim 1, wherein, for each image of the plurality of images:
the respective highest reaction count corresponds to a likelihood of obtaining a maximum number of reactions based on the number of followers of the respective user; and
the respective highest reaction count is calculated using statistical processing.

11. The method of claim 1, wherein, for each image of the plurality of images:
the respective highest reaction count corresponds to a likelihood of obtaining a maximum number of reactions based on the number of followers of the respective user; and
the respective highest reaction count is determined using machine learning.

12. The method of claim 1, wherein the trained neural network is further configured to generate predicted reaction counts for the new images.

13. The method of claim 1, wherein each image of the plurality of images is a moving image or a still image.

14. The method of claim 13, wherein an attribute of the one or more respective attributes is selected from the group consisting of:
human gender;
animal type;
scenery descriptors; and
food descriptors.

15. The method of claim 1, further comprising:
for each image of the plurality of images that is posted to the social media platform:
determining a respective number of objects that appear in the respective image; and
determining one or more respective attributes of one or more objects that appear in the respective image;
wherein the respective set of parameters includes the respective number of objects that appear in the respective image and the one or more respective attributes of one or more objects that appear in the respective image.

16. A computer system, comprising:
one or more processors;
memory; and
one or more programs stored in the memory and configured for execution by the one or more processors, the one or more programs comprising instructions for:
for each image of a plurality of images that is posted to a social media platform by a respective user:
retrieving the respective image;
retrieving respective image information for the respective image;
retrieving a respective reaction count for the respective image, the respective reaction count being a number of reactions from users of the social media platform to the respective image;
calculating a respective evaluation value for the respective image, wherein:
the respective evaluation value for the respective image is determined based on a comparison between the respective reaction count for the respective image and a respective highest reaction count, wherein the respective highest reaction count is computed based on a number of followers, of the respective user, on the social media platform; and
forming a respective set of parameters that include the respective image, the respective evaluation value, and an image type corresponding to the respective image, the image type selected from a predefined plurality of image types;
training a neural network using a plurality of sets of parameters corresponding to the plurality of images, as training data, to correlate the images to output evaluation values, the training including:
extracting features from a convolutional layer of the neural network; and
using the extracted features as inputs to an output layer that generates the output evaluation values;
computing differences between the output evaluation values and the evaluation values in the training data; and
using backward propagation to successively optimize model parameters corresponding to one or more layers of the neural network based on the computed differences, thereby updating the model parameters of the neural network;
storing the trained neural network, including the updated model parameters, in a database of the server system for subsequent use in generating predicted evaluation values for new images, wherein the trained neural network is configured to:
in accordance with receiving, by the server system from a terminal apparatus, a second image and an instruction to evaluate the second image:
apply the trained neural network to generate a first evaluation value corresponding to the second image; and
transmit, by the server system to the terminal apparatus, the first evaluation value.

17. The computer system of claim 16, wherein:
the trained neural network is also trained to generate a predicted image type for each image of the new images.

18. The computer system of claim 16, the one or more programs further comprising instructions for:
for each image of the plurality of images that is posted to the social media platform:
determining a respective number of objects that appear in the respective image; and
determining one or more respective attributes of one or more objects that appear in the respective image;
wherein the respective set of one or more parameters includes the respective number of objects that appear in the respective image and the one or more respective attributes of one or more objects that appear in the respective image.

19. A non-transitory computer readable storage medium storing one or more programs configured for execution by a computer system having one or more processors and memory, the one or more programs comprising instructions for:
for each image of a plurality of images that is posted to a social media platform by a respective user:
retrieving the respective image;
retrieving respective image information for the respective image;
retrieving a respective reaction count for the respective image, the respective reaction count being a number of reactions from users of the social media platform to the respective image;
calculating a respective evaluation value for the respective image, wherein:
the respective evaluation value for the respective image is determined based on a comparison between the respective reaction count for the respective image and a respective highest reaction count, wherein the respective highest reaction count is computed based on a number of followers, of the respective user, on the social media platform; and
forming a respective set of parameters that include the respective image, the respective evaluation value, and an image type corresponding to the respective image, the image type selected from a predefined plurality of image types;
training a neural network using a plurality of sets of parameters corresponding to the plurality of images, as training data, to correlate the images to output evaluation values, the training including:
extracting features from a convolutional layer of the neural network; and
using the extracted features as inputs to an output layer that generates the output evaluation values;
computing differences between the output evaluation values and the evaluation values in the training data; and
using backward propagation to successively optimize model parameters corresponding to one or more layers of the neural network based on the computed differences, thereby updating the model parameters of the neural network;

storing the trained neural network, including the updated model parameters, in a database of the server system for subsequent use in generating predicted evaluation values for new images, wherein the trained neural network is configured to:
in accordance with receiving, by the server system from a terminal apparatus, a second image and an instruction to evaluate the second image:
apply the trained neural network to generate a first evaluation value corresponding to the second image; and
transmit, by the server system to the terminal apparatus, the first evaluation value.

* * * * *